United States Patent
Sarashiya

(10) Patent No.: US 10,397,285 B2
(45) Date of Patent: Aug. 27, 2019

(54) EARLY-MEDIA SERVICE CONTROL DEVICE, EARLY-MEDIA SERVICE CONTROL METHOD, AND STORAGE MEDIUM HAVING PROGRAM STORED THEREON

(71) Applicant: NEC Corporation, Minato-ku, Tokyo (JP)

(72) Inventor: Koichi Sarashiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/079,159

(22) PCT Filed: Feb. 21, 2017

(86) PCT No.: PCT/JP2017/006399
§ 371 (c)(1),
(2) Date: Aug. 23, 2018

(87) PCT Pub. No.: WO2017/150281
PCT Pub. Date: Sep. 8, 2017

(65) Prior Publication Data
US 2019/0052682 A1   Feb. 14, 2019

(30) Foreign Application Priority Data
Feb. 29, 2016   (JP) ................. 2016-038277

(51) Int. Cl.
*H04M 3/42* (2006.01)
*H04L 29/06* (2006.01)

(52) U.S. Cl.
CPC ...... *H04L 65/1069* (2013.01); *H04L 65/1016* (2013.01); *H04L 65/1043* (2013.01);
(Continued)

(58) Field of Classification Search
CPC .................. H04L 65/1069; H04L 65/1016
(Continued)

(56) References Cited

U.S. PATENT DOCUMENTS

| 7,577,109 B2 * | 8/2009 | Belling ................. H04L 29/06 370/260 |
| 2013/0066732 A1 * | 3/2013 | Alyamour ............ G06Q 20/206 705/16 |

(Continued)

FOREIGN PATENT DOCUMENTS

| JP | 2009540659 A | 11/2009 |
| JP | 2010521110 A | 6/2010 |

(Continued)

OTHER PUBLICATIONS

3rd Generation Partnership Project, 3GPP TS 24.628 V13.1.0 Common Basic Communication procedures using IP Multimedia (IM) Core Network (CN) subsystem; Protocol specification (Release 13) Dec. 17, 2015; pp. 1-60 URL: http://www.3gpp.org/ftp/Specs/archive/24_series/24.628/24628-d10.zip.

(Continued)

Primary Examiner — William J Deane, Jr.

(57) ABSTRACT

When a parameter included in a session start request indicates that a session-start-request-transmitting terminal device has reserved a resource, a parameter value rewrite unit rewrites the value of the parameter into a value indicating the resource unreserved. A session start request transmission control unit controls a communication unit to cause a session start request after the value of the parameter is rewritten to be transmitted to a session-start-request-receiving network. When the parameter value rewrite unit has not rewritten the value of the parameter, the received session start request is transmitted. When receiving a response indicating that a resource is reserved in a session-start-request-receiving terminal device, a calling-in-progress (Continued)

notification transmission control unit controls the communication unit so that calling-in-progress notification is transmitted to the session-start-request-transmitting terminal device.

6 Claims, 14 Drawing Sheets

(52) U.S. Cl.
CPC ...... *H04L 65/1063* (2013.01); *H04L 65/1083* (2013.01); *H04L 69/24* (2013.01); *H04M 3/42017* (2013.01); *H04L 65/1006* (2013.01)

(58) Field of Classification Search
USPC ............. 379/207.16, 207.11–207.15, 215.01, 379/112.04, 201.01; 370/352
See application file for complete search history.

(56) References Cited

U.S. PATENT DOCUMENTS

| | | | |
|---|---|---|---|
| 2014/0169227 A1* | 6/2014 | Ginde | H04L 65/1006 370/259 |
| 2016/0308915 A1* | 10/2016 | Balasaygun | H04L 65/1006 |
| 2017/0048563 A1* | 2/2017 | Oman | H04N 21/23406 |
| 2017/0346867 A1* | 11/2017 | Olenfalk | H04L 65/60 |

FOREIGN PATENT DOCUMENTS

| | | |
|---|---|---|
| JP | 2015162827 A | 9/2015 |
| JP | 2015186249 A | 10/2015 |

OTHER PUBLICATIONS

3rd Generation Partnership Project, 3GPP TS 24.182 V13.1.0 IP Multimedia Subsystem (IMS) Customized Alerting Tones (CAT); Protocol specification (Release 13), Jun. 26, 2015; pp. 1-143 URL: http://www.3gpp.org/ftp/Specs/archive/24_series/24.182/24182-d10.zip.

G. Camarillo, H. Schulzrinne, RFC 3960 Early Media and Ringing Tone Generation in the Session Initiation Protocol (SIP), Dec. 2004; pp. 1-13 URL: https://tools.ietf.org/html/rfc3960.

R. Ejzak, RFC 5009 Private Header (P-Header) Extension to the Session Initiation Protocol (SIP) for Authorization of Early Media, Sep. 2007; pp. 1-15 URL: https://tools.ietf.org/html/rfc5009.

International Search Report, dated Apr. 25, 2017 from the International Bureau in counterpart International application No. PCT/JP2017/006399.

CT3, CRs on Inter-IMS NNI Option Items, 3GPP TSG-CT#56 CP-120348, Jun. 15, 2012, 1 page URL:http://www.3gpp.org/ftp/tsg_ct/TSG_CT/TSGC_56_Ljubljana/Docs/CP-120348.zip.

* cited by examiner

EARLY-MEDIA SERVICE CONTROL DEVICE, EARLY-MEDIA SERVICE CONTROL METHOD, AND STORAGE MEDIUM HAVING PROGRAM STORED THEREON

This application is a National Stage Entry of PCT/JP2017/006399 filed on Feb. 21, 2017, which claims priority from Japanese Patent Application 2016-038277 filed on Feb. 29, 2016, the contents of all of which are incorporated herein by reference, in their entirety.

TECHNICAL FIELD

The present invention relates to an early-media service control device, an early-media service control method, and a program.

BACKGROUND ART

Investigation of interconnection of communication networks between communication operators has been underway by the GSMA/3GPP (GSM: registered trademark) being a standardization organization of the IP Multimedia Subsystem (IMS). IMS is a technology in a core network for controlling IP packet transport without depending on an access network.

Several technologies related to the IMS have been proposed. For example, PTL 1 describes a technology for allowing a call-ID, a caller telephone number, and a callee telephone number to be output to a log output by a Transition Gateway (TrGW). In a communication system described in PTL 1, when an Interconnection Border Control Function (IBCF) transmits a MEGACO Add request to a TrGW, the aforementioned information is included in the transmission.

On the other hand, an early media specification is defined in 3GPP TS 24.628 Section 4.2.2. The early media is a technology of performing communication between terminals before a call is established.

Several technologies related to IMS or early media in the Session Initiation Protocol (SIP) being a basis of IMS have been proposed. For example, PTL 2 describes a technology for avoiding media clipping in early media when a session request source terminal is compatible with precondition control but a session request destination terminal is not compatible with precondition control. A SIP server described in PTL 2 completes resource reservation for a first terminal being a session start request source. Further, the SIP server completes resource reservation for a second terminal being a session start request destination and transmits a response thereof to the first terminal. Then, the SIP server receives early media from the second terminal and transfers the received early media to the first terminal.

Further, PTL 3 describes a technology for making a Multimedia Ring Back Tone (MRBT) service and a Multimedia Caller identification (MCID) service applicable in IMS. According to the method described in PTL 3, when a caller-side UE is determined to be an MCID service subscriber, and a callee-side UE is determined to support MCID early media, a negotiation between the MCID early media and the callee-side UE is performed, and the MCID is reproduced on the callee-side UE. On the other hand, when a callee-side UE is determined to be an MRBT service subscriber, and a caller-side UE is determined to support the MRBT early media, a negotiation between the MRBT early media and the caller-side UE is performed, and the MRBT is reproduced on the caller-side UE.

Further, PTL 4 describes an early-media service providing method in a SIP infrastructure. According to the method described in PTL 4, an application server receives, from a calling terminal, a first INVITE message including Session Description Protocol (SDP) information of the calling terminal.

The application server operates in a back-to-back user agent (B2BUA) mode and transfers a second INVITE message to a called terminal. Further, the application server acquires, from a media server, media information of a content provided as early media and further sets an early session for conveying the early media from the media server to the calling terminal. The media server provides the early media for the calling terminal through the early session.

When receiving, from the called terminal, a 180 Ringing message including SDP information of the called terminal, the application server prepares for regular session setting between the calling terminal and the called terminal. Additionally, when receiving a 200 OK message from the called terminal, the application server transfers a stop instruction to the media server in order to end the early media transfer. Then, the application server completes the regular session setting between the calling terminal and the called terminal.

CITATION LIST

Patent Literature

PTL 1: Japanese Unexamined Patent Application Publication No. 2015-186249

PTL 2: Japanese Unexamined Patent Application Publication No. 2015-162827

PTL 3: Japanese Translation of PCT International Application Publication No. 2010-521110

PTL 4: Japanese Translation of PCT International Application Publication No. 2009-540659

SUMMARY OF INVENTION

Technical Problem

A plurality of early media schemes are presented in 3GPP TS 24.628 Section 4.2.2. When early media schemes differ between a caller side and a callee side in IMS, service provision based on early media may be hindered. With regard to the issue, none of PTLs 1 to 4 presents a countermeasure against the case that early media schemes differ between a caller side and a callee side.

An object of the present invention is to provide an early-media service control device, an early-media service control method, and a program that are capable of solving the aforementioned problem.

Solution to Problem

According to a first aspect of the present invention, an early-media service control device comprises: a communication unit; a resource reservation status determination unit that determines whether or not a value of a parameter indicating resource reservation status of a session-start-request-transmitting terminal device is a value indicating reserved, the parameter being included in a session start request transmitted by the session-start-request-transmitting terminal device and received by the communication unit, the session-start-request-transmitting terminal device being based on an early media scheme of starting early-media service execution with receipt of a calling-in-progress notification as one requirement; a parameter value rewriting unit that, when the resource reservation status determination unit determines that the value of the parameter is a value indicating reserved, rewrites the value of the parameter to a value indicating resource unreserved; a session start request transmission control unit that, when the resource reservation status determination unit determines that the value of the parameter is a value indicating reserved, controls the communication unit in such a way that the communication unit transmits, to a session-start-request-receiving network, a session start request in which a value of a parameter is rewritten by the parameter value rewriting unit, and when the resource reservation status determination unit determines that the value of the parameter is not a value indicating reserved, controls the communication unit in such a way that the communication unit transmits, to a session-start-request-receiving network, a session start request received from the session-start-request-transmitting terminal device; and a calling-in-progress notification transmission control unit that, when the communication unit receives a response indicating resource reserved in a session-start-request-receiving terminal device, controls the communication unit in such a way that the communication unit transmits the calling-in-progress notification to the session-start-request-transmitting terminal device, the response being transmitted in response to the session start request transmitted to the session-start-request-receiving network by the communication unit.

According to a second aspect of the present invention, an early-media service control device comprises: a communication unit; an early media compatibility determination unit that determines whether or not a response to a session start request includes early media compatibility information indicating that a session-start-request-receiving network is compatible with early media; a processing completion determination unit that, after the early media compatibility determination unit determines that the response includes the early media compatibility information, determines whether or not the communication unit receives a processing completion signal indicating normal completion of request processing from the session-start-request-receiving network; and a calling-in-progress notification transmission control unit that, when the processing completion determination unit determines that the communication unit receives the processing completion signal, controls the communication unit in such a way that the communication unit transmits a calling-in-progress notification to a session-start-request-transmitting terminal device, the session-start-request-transmitting terminal device being based on an early media scheme of starting early-media service execution with receipt of the calling-in-progress notification as one requirement.

According to a third aspect of the present invention, an early-media service control method by an early-media service control device including a communication unit, comprises: a resource reservation status determination step of determining whether or not a value of a parameter indicating resource reservation status of a session-start-request-transmitting terminal device is a value indicating reserved, the parameter being included in a session start request transmitted by the session-start-request-transmitting terminal device and received by the communication unit, the session-start-request-transmitting terminal device being based on an early media scheme of starting early-media service execution with receipt of a calling-in-progress notification as one requirement; a parameter value rewriting step of, when the value of the parameter is determined to be a value indicating reserved in the resource reservation status determination step, rewriting the value of the parameter to a value indicating resource unreserved; when the value of the parameter is determined to be a value indicating reserved in the resource reservation status determination step, controlling the communication unit in such a way that the communication unit transmits, to a session-start-request-receiving network, a session start request in which a value of a parameter is rewritten in the parameter value rewriting step, and when the value of the parameter is determined to be not a value indicating reserved in the resource reservation status determination step, controlling the communication unit in such a way that the communication unit transmits, to a session-start-request-receiving network, a session start request received from the session-start-request-transmitting terminal device; and a calling-in-progress notification transmission control step of, when receiving a response indicating resource reserved in a session-start-request-receiving terminal device, controlling the communication unit in such a way that the communication unit transmits the calling-in-progress notification to the session-start-request-transmitting terminal device, the response being transmitted in response to the session start request transmitted to the session-start-request-receiving network.

According to a fourth aspect of the present invention, an early-media service control method by an early-media service control device including a communication unit, comprises: an early media compatibility determination step of determining whether or not a response to a session start request includes early media compatibility information indicating that a session-start-request-receiving network is compatible with early media; a processing completion determination step of, after the response is determined to include the early media compatibility information in the early media compatibility determination step, determining whether or not the communication unit receives a processing completion signal indicating normal completion of request processing from the session-start-request-receiving network; and a calling-in-progress notification transmission control step of, when the communication unit is determined to receive the processing completion signal in the processing completion determination step, controlling the communication unit in such a way that the communication unit transmits a calling-in-progress notification to a session-start-request-transmitting terminal device, the session-start-request-transmitting terminal device being based on an early media scheme of starting early-media service execution with receipt of the calling-in-progress notification as one requirement.

According to a fifth aspect of the present invention, a program causes a computer including a communication unit to execute: a resource reservation status determination step of determining whether or not a value of a parameter indicating resource reservation status of a session-start-request-transmitting terminal device is a value indicating reserved, the parameter being included in a session start request transmitted by the session-start-request-transmitting terminal device and received by the communication unit, the session-start-request-transmitting terminal device being based on an early media scheme of starting early-media service execution with receipt of a calling-in-progress notification as one requirement; a parameter value rewriting step of, when the value of the parameter is determined to be a value indicating reserved in the resource reservation status determination step, rewriting the value of the parameter to a value indicating resource unreserved; a session start request transmission control step of, when the value of the parameter is determined to be a value indicating reserved in the resource reservation status determination step, controlling the communication unit in such a way that the communication unit transmits, to a session-start-request-receiving network, a session start request in which a value of a parameter is rewritten in the parameter value rewriting step, and when the value of the parameter is determined to be not a value indicating reserved in the resource reservation status determination step, controlling the communication unit in such a way that the communication unit transmits, to a session-start-request-receiving network, a session start request received from the session-start-request-transmitting terminal device; and a calling-in-progress notification transmission control step of, when a response indicating resource reserved in a session-start-request-receiving terminal device is received, controlling the communication unit in such a way that the communication unit transmits the calling-in-progress notification to the session-start-request-transmitting terminal device, the response being transmitted in response to the session start request transmitted to the session-start-request-receiving network.

According to a sixth aspect of the present invention, a program causes a computer including a communication unit to execute: an early media compatibility determination step of determining whether or not a response to a session start request includes early media compatibility information indicating that a session-start-request-receiving network is compatible with early media; a processing completion determination step of, after the response is determined to include the early media compatibility information in the early media compatibility determination step, determining whether or not the communication unit receives a processing completion signal indicating normal completion of request processing from the session-start-request-receiving network; and a calling-in-progress notification transmission control step of, when the communication unit is determined to receive the processing completion signal in the processing completion determination step, controlling the communication unit in such a way that the communication unit transmits a calling-in-progress notification to a session-start-request-transmitting terminal device, the session-start-request-transmitting terminal device being based on an early media scheme of starting early-media service execution with receipt of the calling-in-progress notification as one requirement.

Advantageous Effects of Invention

The present invention is able to provide a service based on early media even when early media schemes differ between a caller side and a callee side in IMS.

EXAMPLE EMBODIMENT

Figure 1:
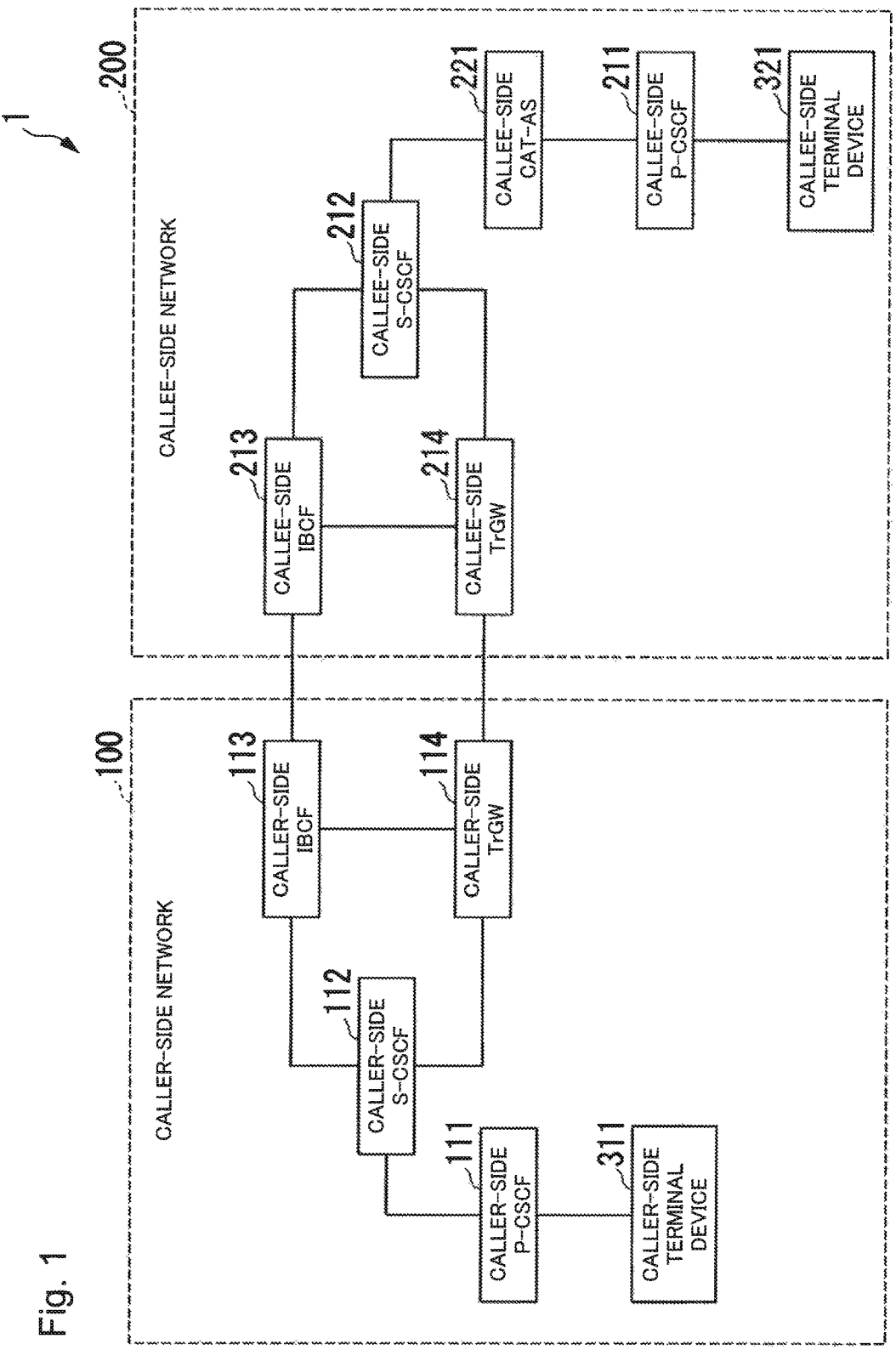
FIG. 1 is a schematic block diagram illustrating a functional configuration of an IMS network according to an example embodiment of the present invention.

While an example embodiment of the present invention will be described below, the following example embodiment does not limit the invention according to the claims. Further, not every combination of features described in the example embodiment is necessarily essential to the solution by the invention.

First, a problem in a case that early media schemes are different in an IMS interconnection will be described.

3GPP TS 24.628 Section 4.2.2 specifying early media requires support of one of the following three schemes:
(1) A gateway model scheme defined by RFC 3960,
(2) Multiple early dialogs (=a forking model scheme) defined by RFC 5009, and
(3) An Alert-Info header scheme using "180 Ringing."

When a communication operator performing an IMS-based interconnection between operators provides early media, the communication operator is considered to support, in particular, either (1) gateway model scheme or (2) forking model scheme.

3GPP TS 24.182 specifying (1) gateway model scheme and (2) forking model scheme treats cooperation between different models to be out of scope. In other words, an interconnection between communication operators employing different models is not specified, and a framework of early media provision in this case is not presented either.

Furthermore, comparing a feature of (1) gateway model scheme with a feature of (2) forking model scheme, there is a particular difference as described below.

(1) Gateway Model Scheme

According to the gateway model scheme, session description protocol (SDP) exchange is performed by a single dialog (SDP_Offer/SDP_Anser). Further, "180 Ringing" is notified to a terminal. The "180 Ringing" is a method of notifying that calling is in progress.

(2) Forking Model Scheme

According to the forking model scheme, SDP exchange is performed by multiple dialogs (SDP_O/A Dialog 1, SDP_O/A Dialog 2). Further, "180 Ringing" is not notified to a caller-side terminal and is terminated at a CAT-AS.

An influence of the difference on early media will be examined.

The following four types may be considered as combinations of the gateway model scheme and the forking model scheme:

(A) Both of a caller side and a callee side employ the gateway model scheme,
(B) The caller side employs the gateway model scheme and the callee side employs the forking model scheme,
(C) The caller side employs the forking model scheme and the callee side employs the gateway model scheme, and
(D) Both of the caller side and the callee side employ the forking model scheme.

In the cases of (A) both of the caller side and the callee side employ the gateway model scheme, and (D) both of the caller side and the callee side employ the forking model scheme, out of the four types, the caller side and the callee side employ the same scheme, and therefore a problem due to a scheme difference does not occur.

Further, in the case of (C) the caller side employs the forking model scheme and the callee side employs the gateway model scheme, a caller-side terminal device does not require "180 Ringing" by conforming to the forking model scheme, and therefore a problem due to whether "180 Ringing" is received or not does not occur.

On the other hand, in the case of (B) the caller side employs the gateway model scheme and the callee side employs the forking model scheme, according to the forking model scheme supported by the callee-side network, "180 Ringing" is terminated at the CAT-AS as described above and is not transmitted to the caller-side network.

However, according to the gateway model scheme supported by the caller-side network, the calling terminal device is assumed to receive an RBT after receiving "180 Ringing."

An operation of the caller-side terminal when receiving an RBT in a state of not receiving "180 Ringing" is not specified. Accordingly, how the caller-side terminal operates when receiving an RBT in a state of not receiving "180 Ringing" depends on implementation of the caller-side terminal.

Accordingly, the caller-side terminal device may not properly execute early media due to "180 Ringing" not being transmitted to the caller-side terminal device.

Further, without being limited to the terminal device, a node in the caller-side network requiring "180 Ringing" in accordance with the specification of the gateway model scheme may exist. For example, there is a possibility that a node in the caller-side network does not grasp when a ring back tone (RBT) is transmitted from the callee-side network due to "180 Ringing" not being transmitted.

Accordingly, in an IMS interconnection between different models (the gateway model scheme and the forking model scheme), equipment in a network employing the gateway model scheme transmits "180 Ringing" to a terminal device transmitting a session request from the same network, according to the present example embodiment.

FIG. 1 is a schematic block diagram illustrating a functional configuration of an IMS network according to an example embodiment of the present invention. As illustrated in the diagram, the IMS network 1 includes a caller-side network 100 and a callee-side network 200. The caller-side network 100 includes a caller-side P-CSCF 111, a caller-side S-CSCF 112, a caller-side IBCF 113, and a caller-side TrGW 114. The callee-side network 200 includes a callee-side P-CSCF 211, a callee-side S-CSCF 212, a callee-side IBCF 213, a callee-side TrGW 214, and a callee-side CAT-AS 221. The caller-side network 100 is communicably connected to a caller-side terminal device 311. Further, the callee-side network 200 is communicably connected to a callee-side terminal device 321.

The caller side herein refers to a calling side (a transmitting side of a session request). The callee side refers to a called side (a receiving side of a session request). A case of the caller-side terminal device 311 transmitting a communication request to the callee-side terminal device 321 will be hereinafter described as an example.

Furthermore, the caller-side terminal device 311 may be included in the caller-side network 100 or may be communicably connected to the caller-side network 100 as a device not included in the caller-side network 100. The callee-side terminal device 321 may be included in the callee-side network 200 or may be communicably connected to the callee-side network 200 as a device not included in the callee-side network 200.

The following description assumes that the caller-side network 100 does not include the caller-side terminal device 311, and the callee-side network 200 does not include the callee-side terminal device 321. Further, the caller-side network 100 and the caller-side terminal device 311 are collectively referred to as a caller-side network 100 side. Further, the callee-side network 200 and the callee-side terminal device 321 are collectively referred to as a callee-side network 200 side.

The IMS network 1 is a communication network establishing a session (call) between the caller-side terminal device 311 and the callee-side terminal device 321, and mediating communication between the caller-side terminal device 311 and the callee-side terminal device 321.

The caller-side network 100 is a core network providing an early-media service by the gateway model scheme.

The callee-side network 200 is a core network providing an early-media service by the forking model scheme.

The caller-side network 100 is IMS connected to the callee-side network 200. The IMS connection herein refers to communication connection between core networks, and the connection conforms to the IMS specification.

The caller-side terminal device 311 is a terminal device being connected to the caller-side P-CSCF 111 and performing communication. The caller-side terminal device 311 needs to receive "180 Ringing" before receiving an RBT, in accordance with the gateway model scheme being an early-media service providing scheme in the caller-side network 100.

The callee-side terminal device 321 is a terminal device being connected to the callee-side P-CSCF 211 and performing communication. The callee-side terminal device 321 processes an early-media service, in accordance with the forking model scheme being an early-media service providing scheme in the callee-side network 200.

The caller-side proxy call/session control function (P-CSCF) 111 is a server device functioning as a proxy server for a terminal device in the caller-side network 100, such as the caller-side terminal device 311.

The callee-side P-CSCF 211 is a server device functioning as a proxy server for a terminal device in the callee-side network 200, such as the callee-side terminal device 321.

Each of the caller-side serving-call session control function (S-CSCF) 112 and the callee-side S-CSCF 212 is a server device functioning as a SIP server and executing session control.

Each of the caller-side interconnection border control function (IBCF) 113 and the callee-side IBCF 213 is positioned on a boundary with an external network. Each of the caller-side IBCF 113 and the callee-side IBCF 213 is a server device functioning as a gateway to an external network and providing network address translation (NAT, IP address conversion) and a firewall function.

Each of the caller-side transition gateway (TrGW) 114 and the callee-side TrGW 214 is a server device performing conversion such as conversion between IPv4 and IPv6.

The callee-side customized alerting tones-application server (CAT-AS) 221 is a server device providing a customized ring back tone (user-preferred ring back tone).

A case of the caller-side IBCF 113 providing the caller-side terminal device 311 with "180 Ringing," according to the present example embodiment, will be described as an example. However, a device providing the caller-side terminal device 311 with "180 Ringing" is not limited to the caller-side IBCF 113 and may be a device capable of providing each device with "180 Ringing" without causing a contradiction. For example, the caller-side P-CSCF 111 may provide the caller-side terminal device 311 with "180 Ringing."

Figure 2:
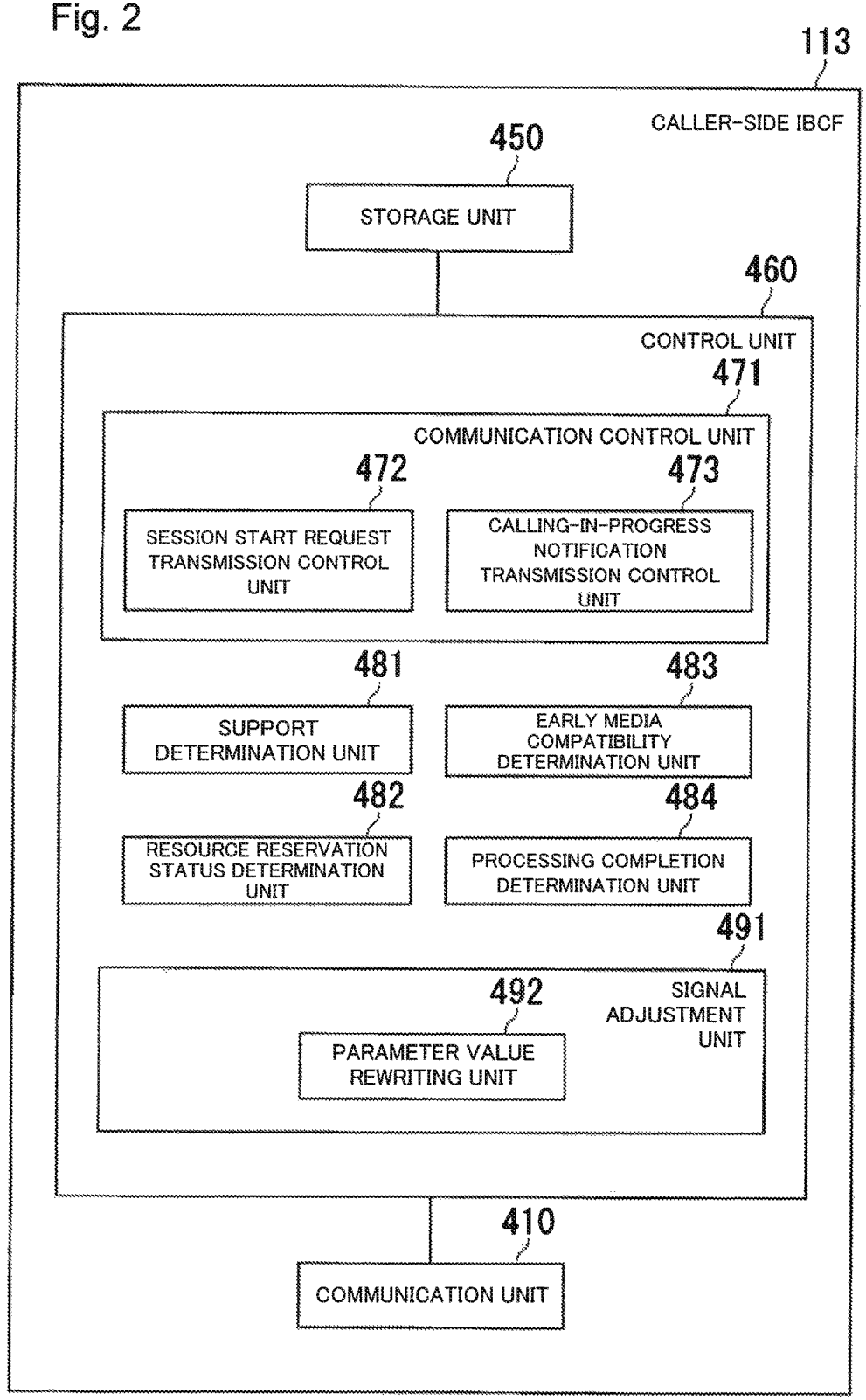
FIG. 2 is a schematic block diagram illustrating a functional configuration of a caller-side IBCF according to the example embodiment.

FIG. 2 is a schematic block diagram illustrating a functional configuration of the caller-side IBCF 113. As illustrated in the diagram, the caller-side IBCF 113 includes a communication unit 410, a storage unit 450, and a control unit 460.

The control unit 460 includes a communication control unit 471, a support determination unit 481, a resource reservation status determination unit 482, an early media compatibility determination unit 483, a processing completion determination unit 484, and a signal adjustment unit 491. The communication control unit 471 includes a session start request transmission control unit 472 and a calling-in-progress notification transmission control unit 473. The signal adjustment unit 491 includes a parameter value rewriting unit 492.

The communication unit 410 communicates with each piece of equipment in the caller-side network 100 and equipment outside the caller-side network 100, in accordance with control by the communication control unit 471. Particularly, the communication unit 410 receives a signal transmitted to the callee-side network 200 side by the caller-side terminal device 311 through the caller-side P-CSCF 111 and the caller-side S-CSCF 112, and transmits to the callee-side network 200 side the received signal or a signal acquired by the signal adjustment unit 491 processing the received signal. Further, the communication unit 410 receives a signal for the caller-side terminal device 311 from the callee-side network 200 side and transmits to the caller-side terminal device 311 the received signal or a signal acquired by the signal adjustment unit 491 processing the received signal, through the caller-side S-CSCF 112 and the caller-side P-CSCF 111.

The storage unit 450 stores various kinds of information. The storage unit 450 is configured by use of a storage device provided in the caller-side IBCF 113. Alternatively, the storage unit 450 may be configured by use of an external storage device.

The control unit 460 controls each unit in the caller-side IBCF 113 and executes various kinds of processing. For example, the control unit 460 is configured by a central processing unit (CPU) provided in the caller-side IBCF 113 reading a program from the storage unit 450 and executing the program.

The communication control unit 471 controls the communication unit 410 and causes the communication unit 410 to perform communication.

The session start request transmission control unit 472 controls the communication unit 410 and causes the communication unit 410 to transmit an "INVITE." When the parameter value rewriting unit 492 performs parameter rewriting on an "INVITE" transmitted by the caller-side terminal device 311 and received by the communication unit 410, the session start request transmission control unit 472 causes the communication unit 410 to transmit the "INVITE" after the parameter rewriting. On the other hand, when the parameter value rewriting unit 492 does not perform parameter rewriting, the session start request transmission control unit 472 causes the communication unit 410 to transmit the "INVITE" received by the communication unit 410. The "INVITE" corresponds to an example of a session start request.

The calling-in-progress notification transmission control unit 473 controls the communication unit 410 and causes the communication unit 410 to transmit "180 Ringing" to the caller-side terminal device 311. The "180 Ringing" corresponds to an example of a calling-in-progress notification.

The support determination unit 481 determines whether or not all of the caller-side network 100 and the caller-side terminal device 311, and the callee-side network 200 and the callee-side terminal device 321 support a precondition.

The precondition herein refers to a specification for notifying another piece of equipment of whether or not a resource reservation (security) for early media exists. Support of a precondition includes support by a network and support by a terminal device. The present example embodiment includes support by the caller-side network 100, support by the callee-side network 200, support by the caller-side terminal device 311, and support by the callee-side terminal device 321. A network supporting a precondition means that each piece of equipment included in the network supports the precondition (i.e. conforms to the precondition specification). Further, out of pieces of equipment included in the network, a piece of equipment not involved in the precondition is assumed to support the precondition. In other words, inclusion of a piece of equipment not involved in a precondition in a network does not mean that the network does not support the precondition.

Either case of a network not supporting a precondition and a terminal device not supporting the precondition is hereinafter expressed as a network side not supporting the precondition. On the other hand, a case of a network supporting a precondition and a terminal device also supporting the precondition is expressed as a network side supporting the precondition.

In either case of a network not supporting a precondition and a terminal device not supporting the precondition, the network operates in such a way as not to support the precondition. Particularly, when any of the caller-side network 100, the callee-side network 200, the caller-side terminal device 311, and the callee-side terminal device 321, according to the present example embodiment, does not support the precondition, processing of notifying equipment in the callee-side network 200 of resource reservation status of the caller-side terminal device 311, to be described later, cannot be applied.

When the caller-side network 100 side does not support a precondition, the equipment in the callee-side network 200 and the callee-side terminal device 321 perform processing, assuming that the caller-side terminal device 311 has already reserved a resource. Further, when the callee-side network 200 side does not support a precondition, the equipment in the caller-side network 100 and the caller-side terminal device 311 perform processing, assuming that the callee-side terminal device 321 has already reserved a resource.

The support determination unit 481 determines whether or not each of the caller-side network 100 side and the callee-side network 200 side supports a precondition. The support determination unit 481 makes the determination by referring to a header or a parameter (e.g. SDP) in a signal communicated between the caller-side network 100 side and the callee-side network 200 side.

The caller-side terminal device 311 here notifies the capability of the caller-side terminal device 311 itself by assigning a parameter "precondition" to a Supported Header in an "INVITE." Further, the callee-side terminal device 321 receiving an "INVITE" transmits a response signal including a precondition parameter (SDP) when the callee-side terminal device 321 itself supports the precondition. On the other hand, the callee-side terminal device 321 transmits a response signal without including SDP when the callee-side terminal device 321 itself does not support the precondition.

Then, the caller-side IBCF 113 determines whether or not the caller-side network 100 side supports the precondition by referring to the header in the "INVITE" transmitted by the caller-side terminal device 311. Further, the caller-side IBCF 113 determines whether or not the callee-side network 200 side supports the precondition by referring to a parameter or a header in the response signal (e.g. a "183 (D1)" response) transmitted by the callee-side terminal device 321.

The resource reservation status determination unit 482 determines whether or not a parameter (SDP) value indicating resource reservation status of the caller-side terminal device 311 is a value indicating reserved. The parameter is included in an "INVITE" transmitted by the caller-side terminal device 311 and received by the communication unit 410.

The early media compatibility determination unit 483 determines whether or not a "sendrecv" parameter is set to a P-Early-Media header field in a "183 (D1)" response transmitted by the callee-side CAT-AS 221 in response to an "INVITE." The "183" response corresponds to an example of a response to a session start request. The setting of the "sendrecv" parameter to the P-Early-Media header field in a "183 (D1)" response corresponds to an example of early media compatibility information indicating that a session-start-request-receiving network is compatible with early media.

The processing completion determination unit 484 determines whether or not the communication unit 410 receives "200 OK (PRACK)" transmitted by the callee-side CAT-AS 221 in the callee-side network 200. The "200 OK (PRACK)" corresponds to an example of a processing completion signal indicating normal completion of request processing.

The signal adjustment unit 491 processes a signal received by the communication unit 410. The signal adjustment unit 491 performs different kinds of processing depending on a determination result by the support determination unit 481. When the caller-side network 100 side supports a precondition and a resource is reserved by the caller-side terminal device 311, the caller-side IBCF 113 notifies to the callee-side network 200 side that a resource is unreserved, for the time being. Consequently, the caller-side IBCF 113 receives a "18x (D2)" response, converts the response into "180 Ringing," and transmits the "180 Ringing" to the caller-side terminal device 311. Note that "x" denotes a single-character numeral. For example, the caller-side IBCF 113 receives a "183 (D2)" response.

On the other hand, when either or both of the caller-side network 100 side and the callee-side network 200 side do not support a precondition, the caller-side IBCF 113 is not able to change resource reservation status of the caller-side terminal device 311 to unreserved and notify the status to the callee-side network 200 side. Accordingly, the caller-side IBCF 113 determines whether or not a condition for a start of an early-media service is satisfied by referring to a header in a signal received from the callee-side network 200 side.

The parameter value rewriting unit 492 rewrites a parameter in an "INVITE" transmitted by the caller-side terminal device 311. Specifically, when a parameter (SDP) value indicating resource reservation status of the caller-side terminal device 311 is a value indicating reserved, the parameter value rewriting unit 492 rewrites the value to a value indicating unreserved.

Processing performed by the signal adjustment unit 491 will be described here with reference to FIGS. 3 to 11. Note that the caller-side terminal device 311, the callee-side terminal device 321, and the caller-side IBCF 113, the callee-side S-CSCF 212, and the callee-side CAT-AS 221 out of the respective units in the IMS network 1 are illustrated in FIGS. 3 to 11, and an illustration of the respective remaining units is omitted.

Figure 3:
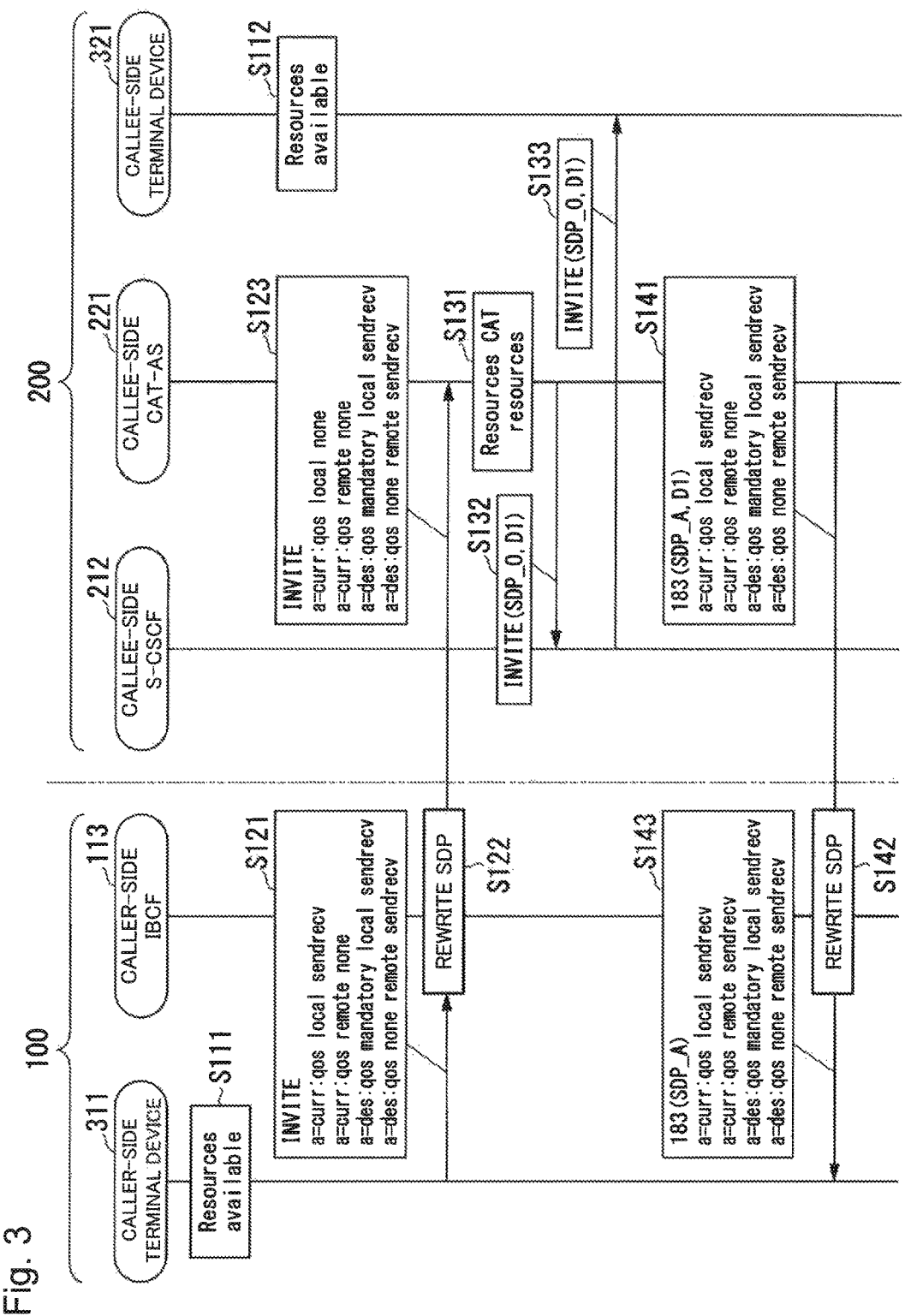
FIG. 3 is a diagram illustrating a first example of an operation of the IMS network when both of a caller-side network side and a callee-side network side support a precondition, according to the example embodiment.
Figure 4:
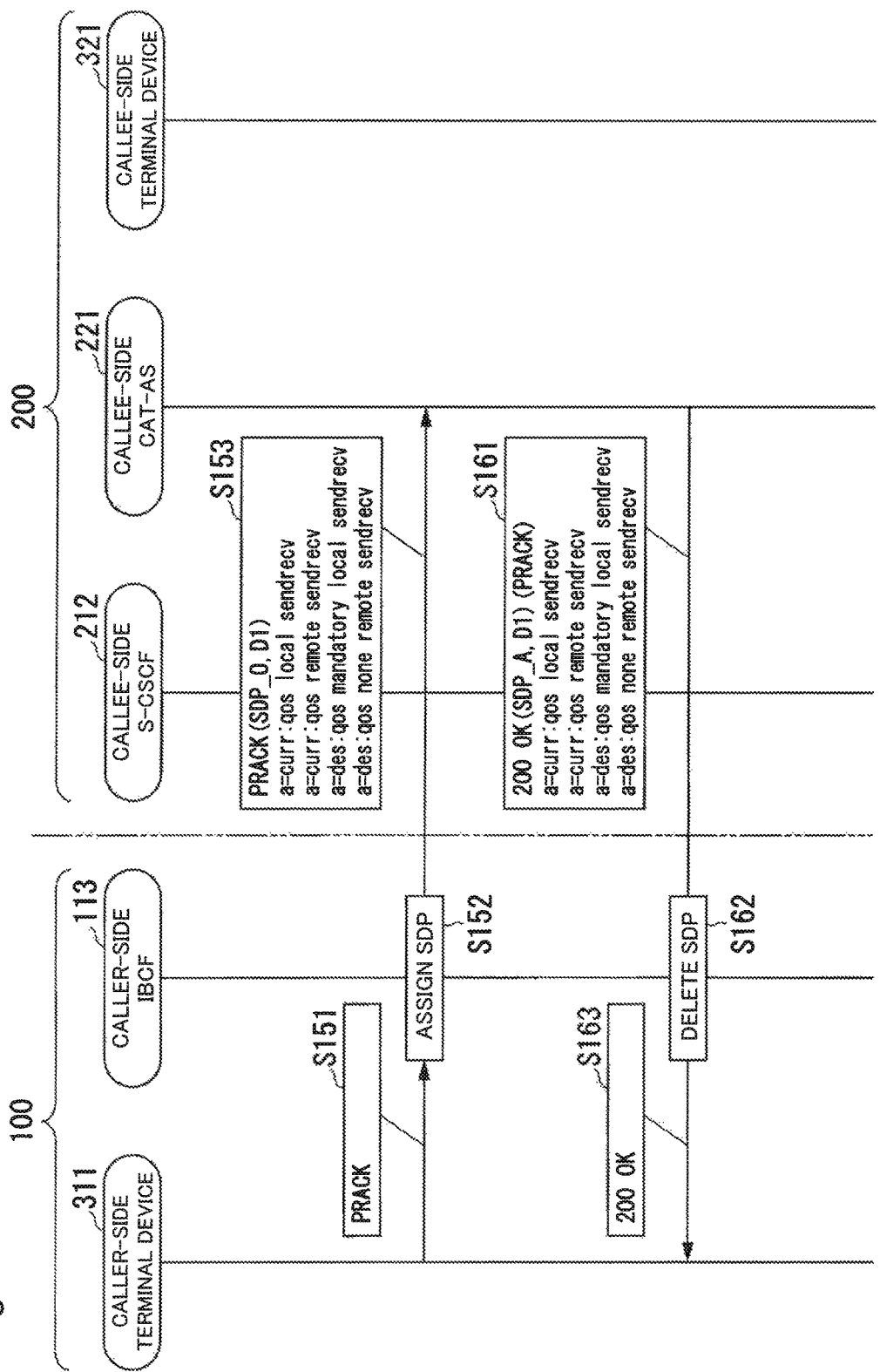
FIG. 4 is a diagram illustrating the first example of the operation of the IMS network when both of the caller-side network side and the callee-side network side support the precondition, according to the example embodiment.
Figure 5:
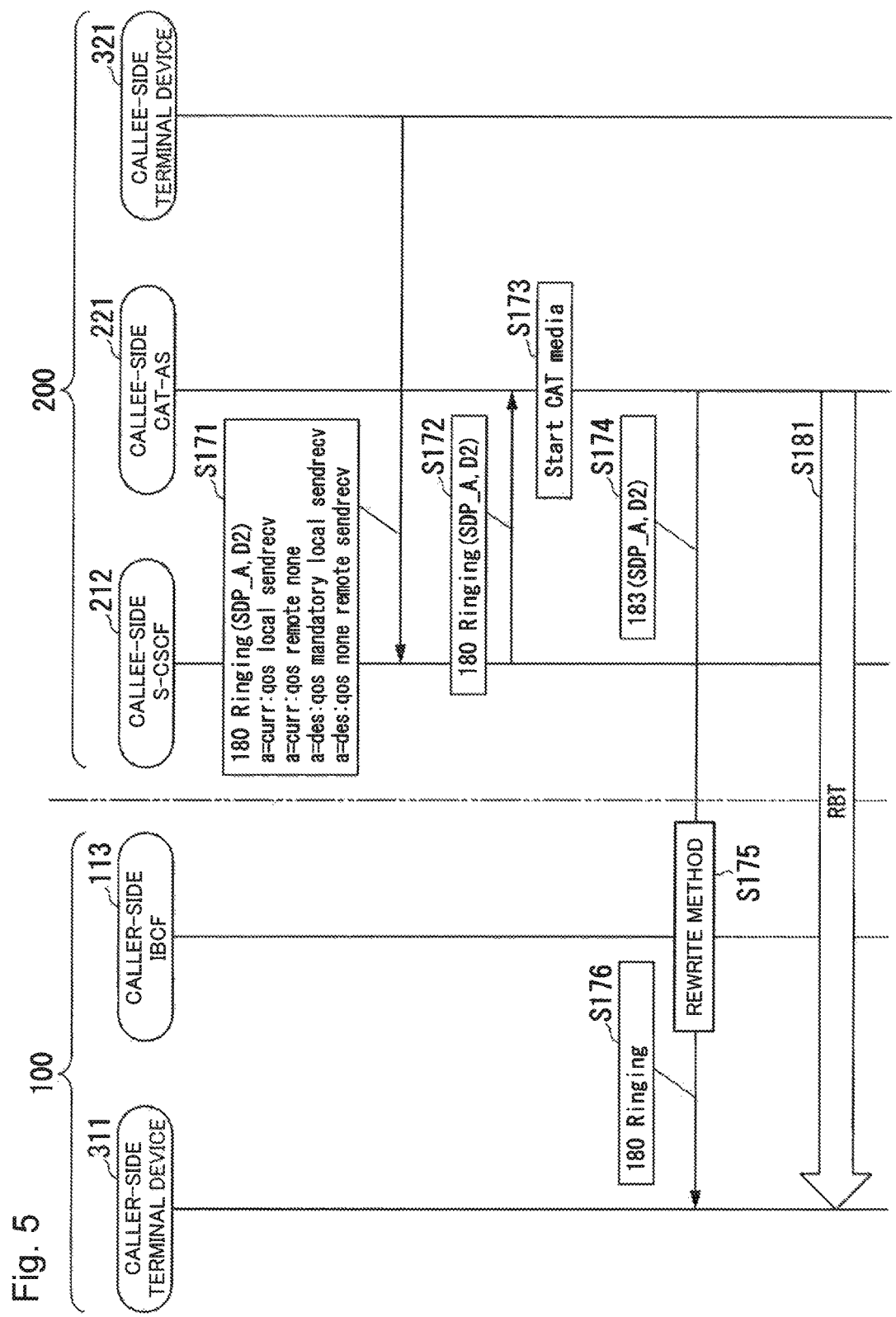
FIG. 5 is a diagram illustrating the first example of the operation of the IMS network when both of the caller-side network side and the callee-side network side support the precondition, according to the example embodiment.

FIGS. 3 to 5 are diagrams illustrating a first example of an operation of the IMS network 1 when both of the caller-side network 100 side and the callee-side network 200 side support a precondition. The caller-side network 100 employs the gateway model scheme, and the callee-side network 200 employs the forking model scheme.

The diagrams illustrate an example that, when the caller-side terminal device 311 transmits an "INVITE," resources are already reserved by both of the caller-side terminal device 311 and the callee-side terminal device 321. The caller-side terminal device 311 has reserved a resource in Sequence S111. Further, the callee-side terminal device 321 has reserved a resource in Sequence S112.

In the processing in the diagrams, the caller-side terminal device 311 transmits an "INVITE" (Sequence S121). Out of parameters (SDP indicating the precondition) in the "INVITE," "curr" indicates a current state, and "des" indicates a desired state (a condition for satisfying the precondition). Further, an SDP value "sendrecv" indicates a state in which transmission and reception are possible, and "none" indicates a state in which transmission and reception are not possible. Alternatively, "none" indicates a state in which whether or not transmission and reception are possible is unknown.

The caller-side terminal device 311 has reserved a resource and therefore sets a current ("curr") SDP value on the caller side ("local") to "sendrecv."

Note that "local" indicates the caller-side terminal device 311 and "remote" indicates the callee-side terminal device 321 in a signal transmitted by the caller-side terminal device 311. On the other hand, "local" indicates the callee-side terminal device 321 and "remote" indicates the caller-side terminal device 311 in a signal transmitted by the callee-side terminal device 321.

In the caller-side IBCF 113 in which the communication unit 410 receives the "INVITE" from the caller-side terminal device 311, the parameter value rewriting unit 492 in the signal adjustment unit 491 rewrites the SDP value (Sequence S122). The signal adjustment unit 491 rewrites the current SDP value on the caller side from "sendrecv" to "none." Regardless of whether or not the caller-side terminal device 311 has reserved a resource, resource unreserved is notified, for the time being, to the callee-side network 200 side, and then "18x (D2)" corresponding to "180 Ringing" is acquired.

Based on a determination result by the resource reservation status determination unit 482, the parameter value rewriting unit 492 performs rewriting of the SDP value in Sequence S122. Specifically, the resource reservation status determination unit 482 determines whether or not the caller-side terminal device 311 has reserved a resource, by determining whether or not the current ("curr") SDP value on the caller side ("local") in the "INVITE" is "sendrecv." When the resource reservation status determination unit 482 determines that the caller-side terminal device 311 has reserved a resource, the parameter value rewriting unit 492 performs the SDP value rewriting in Sequence S122.

The communication unit 410 transmits to the callee-side network 200 side an "INVITE" in which the SDP value is rewritten by the signal adjustment unit 491 (Sequence S123). The communication unit 410 performs the transmission of the "INVITE" in Sequence S123, in accordance with control by the session start request transmission control unit 472 in the communication control unit 471.

The callee-side CAT-AS 221 receiving the "INVITE" in Sequence S123 prepares a resource for Customized alerting tones (CAT) (Sequence S131). Consequently, the callee-side CAT-AS 221 is able to transmit a customized ring back tone (e.g. music preferred by a caller).

Then, the callee-side CAT-AS 221 transmits an "INVITE" to the callee-side S-CSCF 212 (Sequence S132). Note that "D1" (Dialog 1) in SDP indicates a dialog related to SDP exchange (session establishment) between the caller-side terminal device 311 and the callee-side CAT-AS 221.

The callee-side S-CSCF 212 transmits an "INVITE" to the callee-side terminal device 321 (Sequence S133).

Further, the callee-side CAT-AS 221 transmits to the caller-side network 100 a "183 (D1)" response (183 Session Progress) in response to the "INVITE" (Sequence S141).

Note that, in the "INVITE" received by the callee-side CAT-AS 221 in Sequence S123, the SDP ("curr," "local") indicating a current state on the caller side is set to resource unreserved ("none"). In response, out of the SDP in the "183 (D1)" response, the callee-side CAT-AS 221 sets the "curr," "remote" SDP value indicating a current state on the caller side to "none" (a value indicating resource unreserved).

In the caller-side network 100 in which the communication unit 410 receives the "183 (D1)" response in Sequence S141, the signal adjustment unit 491 rewrites the SDP value (Sequence S142). Out of the SDP in the "183" response, the signal adjustment unit 491 rewrites the "curr," "remote" SDP value indicating a current state on the caller-side to "sendrecv" (a value indicating resource reserved). In Sequence S142, the caller-side IBCF 113 performs parameter rewriting being, so to speak, the inverse of Sequence S122. The reason is to maintain consistency in the caller-side network 100 against the rewriting in Sequence S122.

The communication unit 410 transmits to the caller-side terminal device 311 the "183" response in which the SDP value is rewritten by the signal adjustment unit 491 (Sequence S143).

Note that, since the caller-side IBCF rewrites the "183" response in accordance with the gateway model scheme, the "183" response in Sequence S143 does not indicate a distinction between "D1" and "D2."

The caller-side terminal device 311 receiving the "183" response in Sequence S143 transmits a "provisional response acknowledgement (PRACK)" (Sequence S151). The "PRACK" is a delivery acknowledgement for a provisional response. The caller-side terminal device 311 has confirmed that the precondition is satisfied in the SDP in the "183" response received in Sequence S143 and therefore transmits the "PRACK" without assigning SDP thereto.

In the caller-side IBCF 113 in which the communication unit 410 receives the "PRACK" in Sequence S151, the signal adjustment unit 491 assigns SDP to the "PRACK" (Sequence S152).

Particularly, in order to pretend that the caller-side changes from resource unreserved to reserved, the caller-side IBCF 113 sets the "curr," "remote" SDP value indicating a current state on the caller-side to "sendrecv."

Note that the method of the caller-side IBCF 113 notifying resource reserved on the caller-side to the callee-side network 200 is not limited to the method of assigning SDP to a "PRACK." For example, the caller-side IBCF 113 may not assign SPD to a "PRACK" and transmit an "UPDATE" after receiving "200 OK (PRACK)" from the callee-side. In other words, the caller-side IBCF 113 may not notify resource reserved on the caller-side IBCF 113 side by a "PRACK" and separately transmit a signal for notifying resource reserved.

The communication unit 410 transmits to the callee-side network 200 side a "PRACK" to which SDP is assigned by the signal adjustment unit 491 (Sequence S153).

The callee-side CAT-AS 221 receiving the "PRACK" in Sequence S152 replies "200 OK (PRACK)" (Sequence S161). The "200 OK (PRACK)" is a response indicating that a request is normally processed.

The callee-side CAT-AS 221 assigns SDP based on the SDP in the "PRACK" received in Sequence S153 to the "200 OK (PRACK)." Particularly, based on the "sendrecv" of "curr," "local" (SDP indicating a current state on the caller-side) value in the "PRACK," the callee-side CAT-AS 221 sets the "curr," "remote" SDP (SDP indicating a current state on the caller-side) value in the "200 OK (PRACK)" to "sendrecv." The SDP value indicates that the callee-side CAT-AS 221 grasps the caller-side resource being changed from unreserved to reserved and the precondition being satisfied.

In the caller-side IBCF 113 in which the communication unit 410 receives the "200 OK (PRACK)" in Sequence S162, the signal adjustment unit 491 deletes the SDP (Sequence S162). The signal adjustment unit 491 performs processing being, so to speak, the inverse of the SDP assignment in Sequence S152. The reason is to maintain consistency in the caller-side network 100 against the processing in Sequence S152.

The communication unit 410 transmits to the caller-side terminal device 311 the "200 OK (PRACK)" in which the SDP is deleted by the signal adjustment unit 491 (Sequence S163).

Further, the callee-side terminal device 321 receiving the "INVITE" in Sequence S133 transmits "180 Ringing" when calling is started (Sequence S171). For example, the "180 Ringing" is a response indicating that calling, such as ringing a ring back tone, is in progress.

Based on the SDP in the "INVITE" received in Sequence S133, the callee-side terminal device 321 sets the "curr," "remote" SDP value indicating a current state on the caller side to "none" indicating resource unreserved.

Note that "D2" (Dialog 2) in the SDP indicates SDP related to SDP exchange (session establishment) between the caller-side terminal device 311 and the callee-side terminal device 321.

The callee-side S-CSCF 212 receiving the "180 Ringing" in Sequence S171 transmits "180 Ringing" to the callee-side CAT-AS 221 (Sequence S172). The callee-side CAT-AS 221 receiving the "180 Ringing" starts CAT media (Sequence S173). In other words, the callee-side CAT-AS 221 starts transmission processing of a customized ring back tone.

Further, since the SDP in the "180 Ringing" received in Sequence S172 does not satisfy the precondition, the callee-side CAT-AS 221 transmits a "183 (D2)" response to the caller-side network 100 side (Sequence S174).

According to the forking model scheme, the callee-side CAT-AS 221 terminates received "180 Ringing" and does not transmit the "180 Ringing" to the caller-side network 100 side. On the other hand, by the caller-side network 100 notifying resource unreserved on the caller-side network 100 side to the callee-side network 200 side and then notifying resource reserved on the caller-side network 100 side, the callee-side CAT-AS 221 transmits a "183 (D2)" response corresponding to "180 Ringing" to the caller-side network 100 side.

In the caller-side IBCF 113 in which the communication unit 410 receives the "183 (D2)" in Sequence S174, the signal adjustment unit 491 rewrites a method (Sequence S175). Specifically, the caller-side IBCF 113 performs rewriting from the "183 (D2)" response to "180 Ringing."

As described above, since the callee-side network 200 is compatible with the forking model, the callee-side CAT-AS 221 terminates the "180 Ringing" and does not transmit the "180 Ringing" to the caller-side network 100 side. On the other hand, as described above, the callee-side CAT-AS 221 transmits a "183 (D2)" response corresponding to "180 Ringing." Then, the signal adjustment unit 491 rewrites the acquired "183 (D2)" to "180 Ringing" required in the gateway model scheme.

The communication unit 410 transmits to the caller-side terminal device 311 the "180 Ringing" rewritten from the "183 (D2)" response by the signal adjustment unit 491 (Sequence S176). The communication unit 410 performs the transmission of the "180 Ringing" in Sequence S176, in accordance with control by the calling-in-progress notification transmission control unit 473 in the communication control unit 471.

After transmitting the "180 Ringing" in Sequence S174, the callee-side CAT-AS 221 transmits a customized ring back tone (RBT) (Sequence S181).

With regard to subsequent processing, illustration and description thereof are omitted.

In the example in FIGS. 3 to 5, the caller-side network 100 side employs the gateway model scheme, whereas the callee-side network 200 side employs the forking model scheme. The gateway model scheme employed on the caller-side network 100 side assumes that "180 Ringing" is transmitted, and processing in a case of an RBT being transmitted without "180 Ringing" being transmitted is not specified.

Accordingly, processing in a case of the caller-side terminal device 311 receiving an RBT without receiving "180 Ringing" depends on implementation of the caller-side terminal device 311, and the caller-side terminal device 311 may not operate normally.

In contrast, by the caller-side IBCF 113 transmitting an "INVITE" as resource unreserved even when a resource is reserved (Sequences S113 to S114), "180 Ringing" can be transmitted from the callee-side network 200 side to the caller-side network 100 side (Sequences S171 to S176). Consequently, the caller-side terminal device 311 is able to receive an RBT after receiving the "180 Ringing," and the caller-side terminal device 311 is expected to operate normally in accordance with the gateway model scheme.

Furthermore, in a case that differs from the example in FIGS. 3 to 5 only in that the callee-side terminal device 321 has not yet reserved a resource when an "INVITE" is transmitted," "Resource available" on the callee-side network 200 side (Sequence S112 in FIG. 3) is simply positioned after the "INVITE," and the operation itself is similar to the example in FIGS. 3 to 5.

Figure 6:
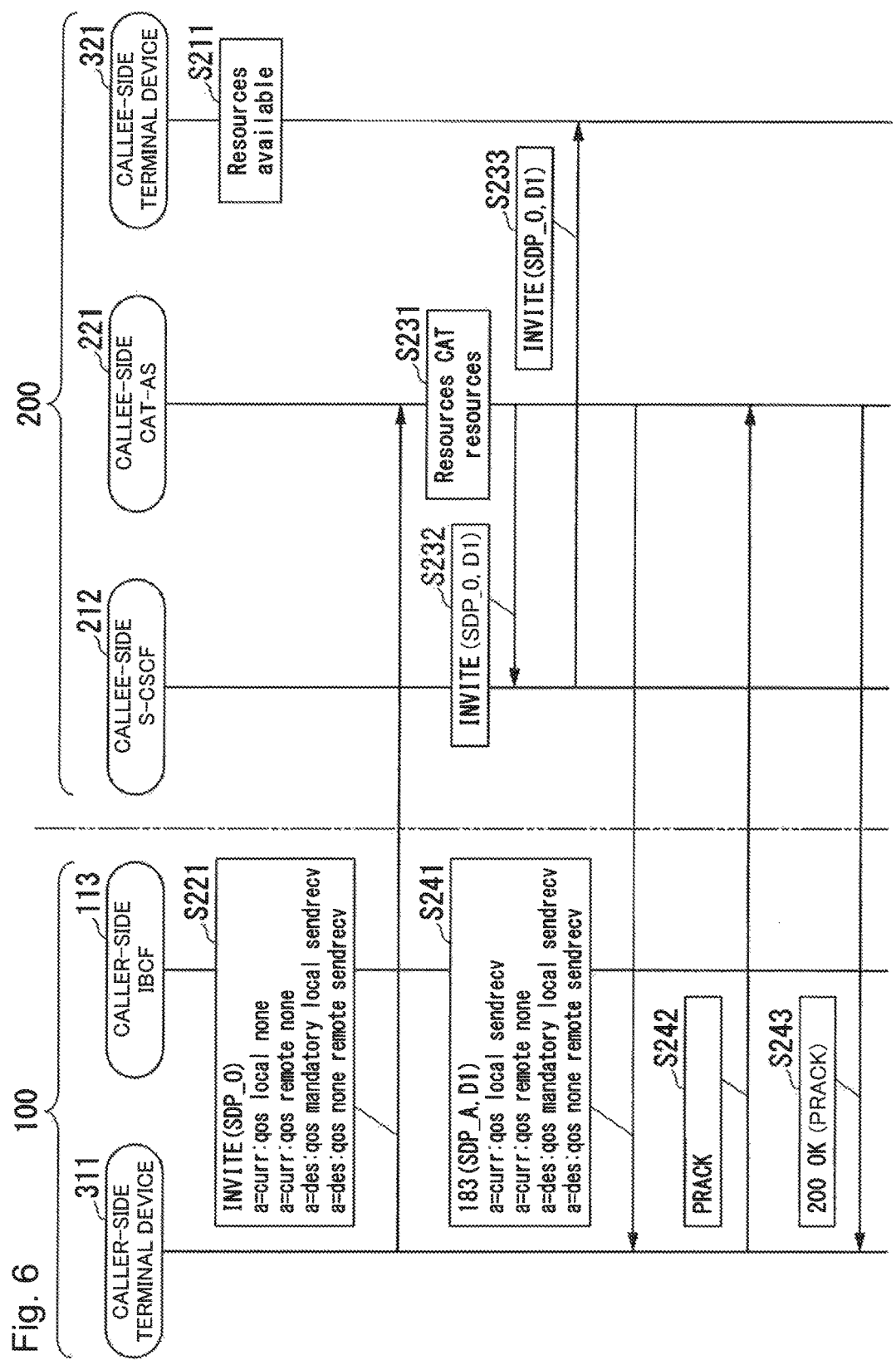
FIG. 6 is a diagram illustrating a second example of the operation of the IMS network when both of the caller-side network side and the callee-side network side support a precondition, according to the example embodiment.
Figure 7:
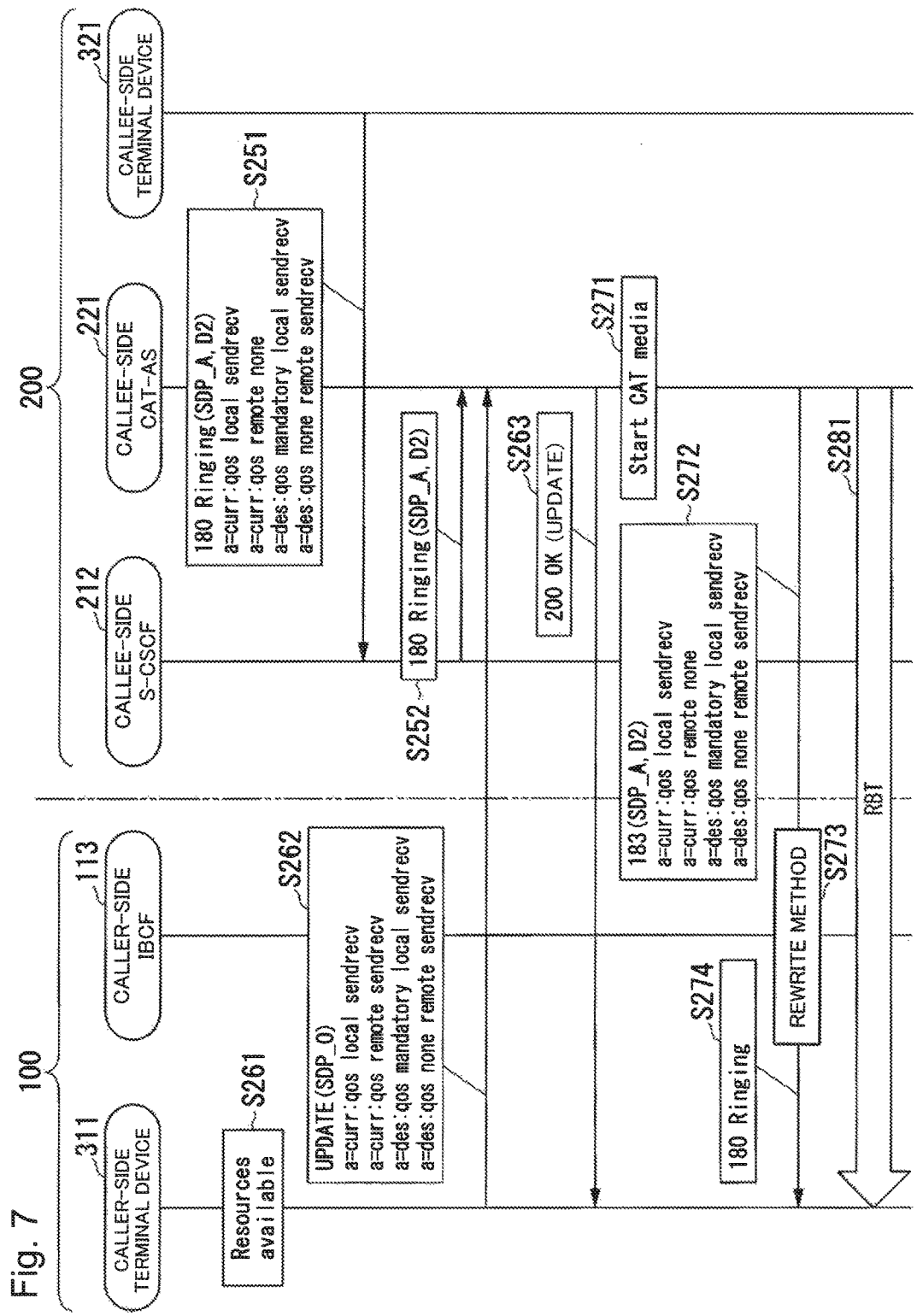
FIG. 7 is a diagram illustrating the second example of the operation of the IMS network when both of the caller-side network side and the callee-side network side support the precondition, according to the example embodiment.

FIGS. 6 and 7 are diagrams illustrating a second example of the operation of the IMS network 1 when both of the caller-side network 100 side and the callee-side network 200 side support a precondition. The caller-side network 100 employs the gateway model scheme, and the callee-side network 200 employs the forking model scheme.

The diagram illustrates an example of a case that, when the caller-side terminal device 311 transmits an "INVITE," the callee-side terminal device 321 has already reserved a resource but the caller-side terminal device 311 has not reserved a resource. The callee-side terminal device 321 has reserved a resource in Sequence S211.

In the processing in the diagram, the caller-side terminal device 311 transmits an "INVITE" (Sequence S221). Unlike the case in FIG. 3, the caller-side terminal device 311 has not yet reserved a resource in the example in FIGS. 6 and 7. Accordingly, the caller-side terminal device 311 sets a "curr," "local" SDP (SDP indicating a current state on the caller side) value in the "INVITE" to "none" (a value indicating resource unreserved). Hence, in FIG. 6, unlike Sequence S122 in FIG. 3, the caller-side IBCF 113 transmits the "INVITE" as-is to the callee-side network 200 side without changing the SDP value. Specifically, the resource reservation status determination unit 482 determines that the caller-side terminal device 311 has not reserved a resource, by referring to the SDP value. Based on the determination result, the session start request transmission control unit 472 in the communication control unit 471 controls the communication unit 410 and causes the communication unit 410 to transfer the "INVITE" (the "INVITE" without rewriting of the SDP value) to the callee-side network 200 side.

Sequences S231 to S233 are similar to Sequences S131 to S133 in FIG. 3.

Further, similarly to the case in FIG. 3, the callee-side CAT-AS 221 transmits a "183 (D1)" response to the caller-side network 100 side (Sequence S241). In FIG. 6, unlike the case in FIG. 3, the SDP value ("none" of the "curr," "remote" SDP value in particular) in the "183 (D1)" response transmitted by the callee-side CAT-AS 221 matches the current state. Accordingly, the caller-side IBCF 113 transmits to the caller-side terminal device 311 the SDP in the "183 (D1)" response as-is without rewriting. Specifically, the communication control unit 471 controls the communication unit 410 and causes the communication unit 410 to transfer the "183" response to the caller-side terminal device 311.

The caller-side terminal device 311 receiving the "183" response transmits a "PRACK" to the callee-side network 200 side (Sequence S242). Since there is no state change from the "183" response here, the caller-side terminal device 311 transmits the "PRACK" without assigning SDP indicating a state. The "PRACK" matches the current state of the caller-side network 100 and the callee-side network 200, and therefore the caller-side IBCF 113 transmits the "PRACK" as-is to the callee-side network 200 side. Specifically, the communication control unit 471 controls the communication unit 410 and causes the communication unit 410 to transmit the "PRACK" to the caller-side network 100 side.

Since the precondition is not satisfied, the callee-side CAT-AS 221 terminates the "PRACK" and replies "200 OK (PRACK)," on the callee-side network 200 side (Sequence S243). The caller-side IBCF 113 also transmits the "200 OK" as-is to the caller-side terminal device 311. Specifically, the communication control unit 471 controls the communication unit 410 and causes the communication unit 410 to transmit the "200 OK" to the caller-side terminal device 311.

Sequences S251 and S252 are similar to Sequences S171 and S172 in FIG. 5.

Further, the caller-side terminal device 311 reserving a resource (Sequence S261) transmits an "UPDATE" to the callee-side network 200 side (Sequence S262). The "UPDATE" is a method notifying an SDP update. The caller-side IBCF 113 also transmits the "UPDATE" as-is to the caller-side terminal device 311. Specifically, the communication control unit 471 controls the communication unit 410 and causes the communication unit 410 to transmit the "UPDATE" to the caller-side terminal device 311. The callee-side CAT-AS 221 is able to detect, by referring to the "UPDATE", that the precondition is satisfied.

The callee-side CAT-AS 221 receiving the "UPDATE" in Sequence S262 replies "200 OK (UPDATE)" (Sequence S263). The caller-side IBCF 113 also transmits the "200 OK" as-is to the caller-side terminal device 311. Specifically, the communication control unit 471 controls the communication unit 410 and causes the communication unit 410 to transmit the "200 OK" to the caller-side terminal device 311.

Sequences S271 to S274 are similar to Sequences S173 to S176 in FIG. 5. Sequence S281 is similar to Sequence S181 in FIG. 5. In the case of FIG. 7, similarly to the case in FIG. 5, the caller-side terminal device 311 receives an RBT after receiving "180 Ringing."

With regard to processing after Sequence S281, illustration and description thereof are omitted.

Furthermore, in a case that differs from the example in FIGS. 6 and 7 only in that the callee-side terminal device 321 has not yet reserved a resource when an "INVITE" is transmitted, "Resource available" on the callee-side network 200 side (Sequence S211 in FIG. 6) is simply positioned after the "INVITE," and the operation itself is similar to the example in FIGS. 6 and 7.

Figure 8:
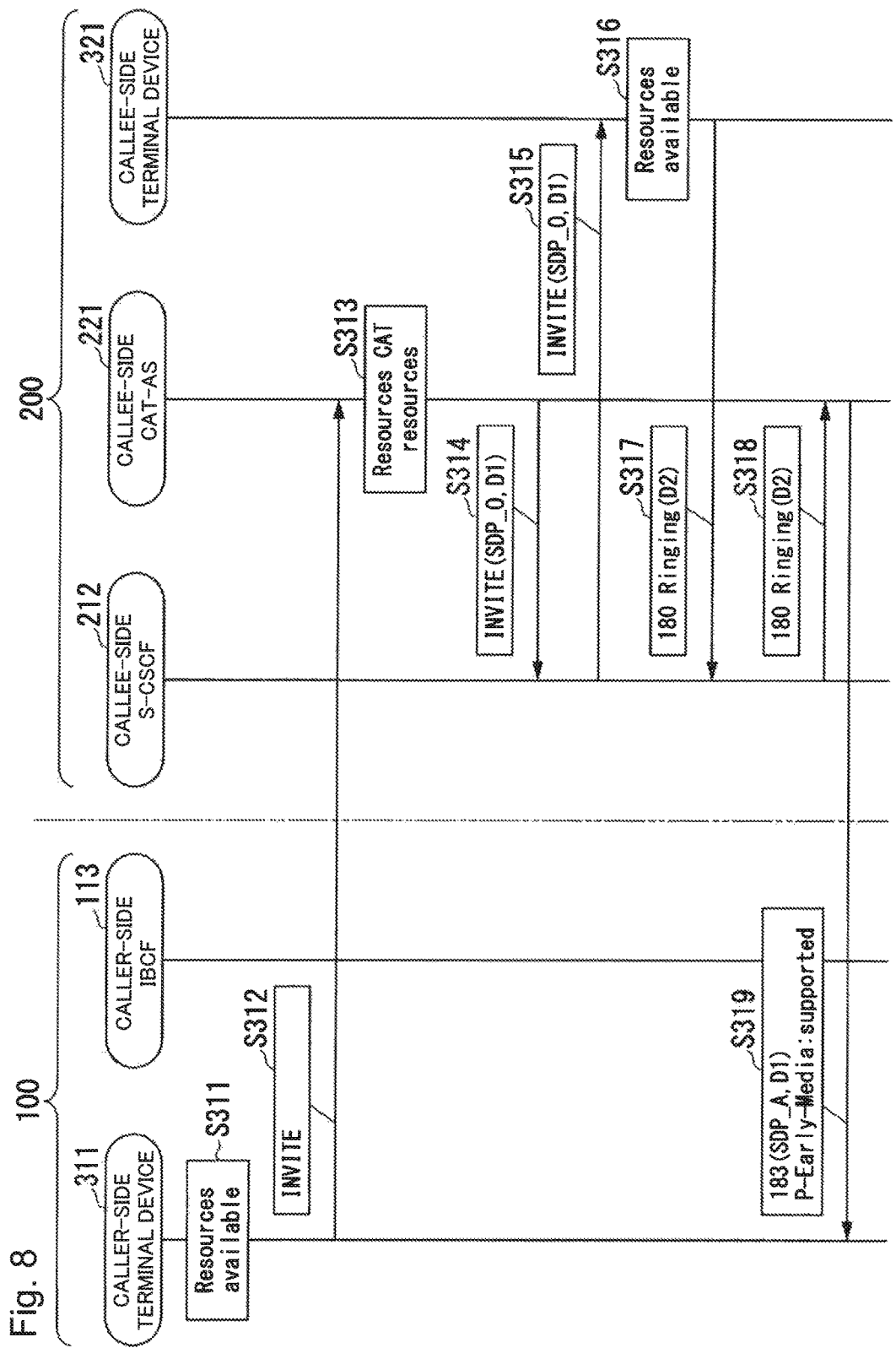
FIG. 8 is a diagram illustrating an operation example of the IMS network when the callee-side network side supports a precondition but the caller-side network side does not support the precondition, according to the example embodiment.
Figure 9:
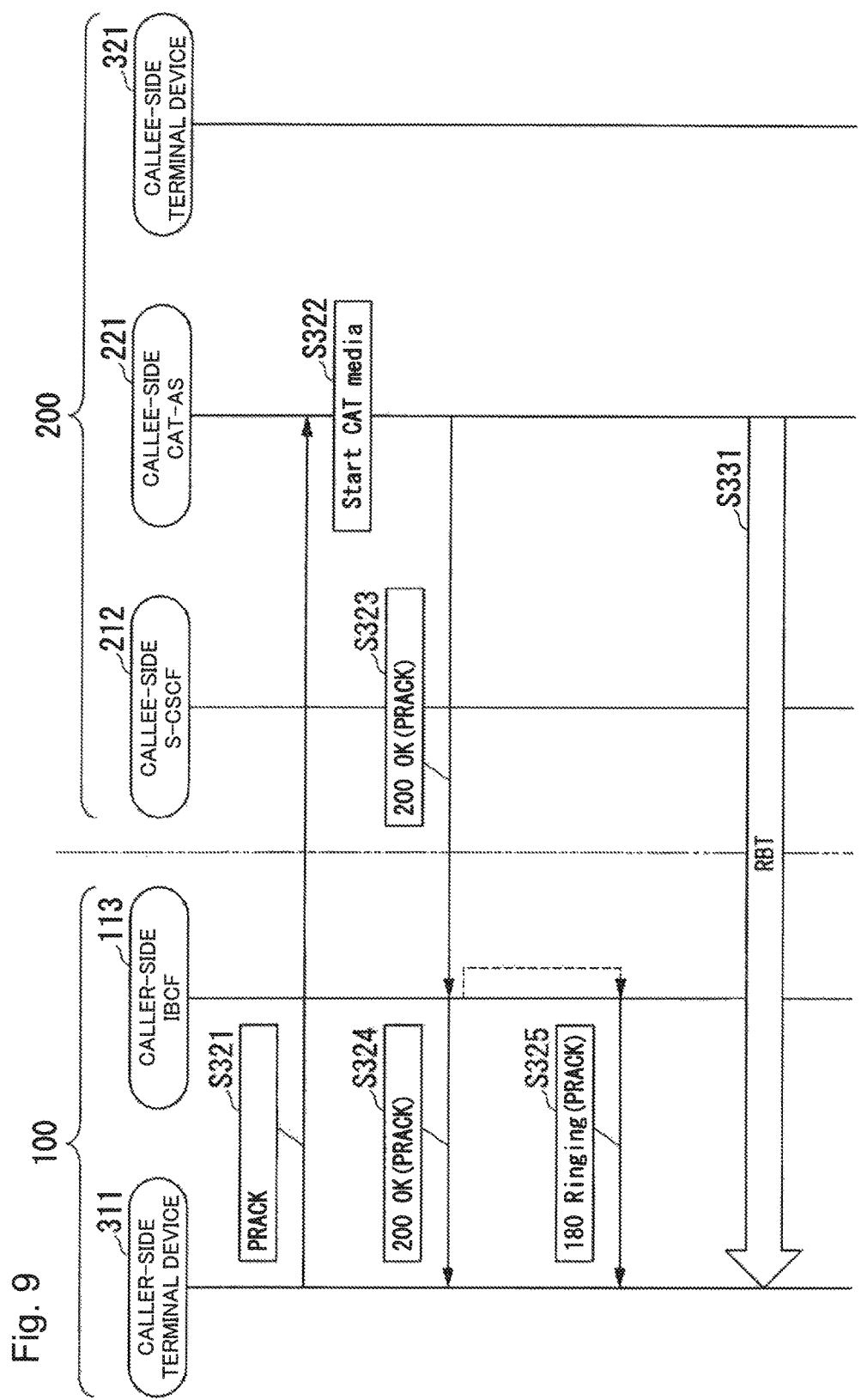
FIG. 9 is a diagram illustrating the operation example of the IMS network when the callee-side network side supports the precondition but the caller-side network side does not support the precondition, according to the example embodiment.

FIGS. 8 and 9 are diagrams illustrating an operation example of the IMS network 1 when the callee-side network 200 supports a precondition but the caller-side network 100 does not support the precondition. The caller-side network 100 employs the gateway model scheme, and the callee-side network 200 employs the forking model scheme.

The diagram illustrates an example of a case that, when the caller-side terminal device 311 transmits an "INVITE," the callee-side terminal device 321 has not reserved a resource. Since the caller-side network 100 does not support the precondition, the caller-side terminal device 311 is always able to use a resource when the caller-side terminal device 311 transmits an "INVITE," as indicated in Sequence S311.

In the processing in the diagram, the caller-side terminal device 311 transmits an "INVITE" (Sequence S312). When the caller-side terminal device 311 is incompatible with the precondition, SDP is not assigned to the "INVITE." In this case, regardless of whether or not the callee-side terminal device 321 has completed resource reservation, each equipment in the caller-side network 100 (the caller-side terminal device 311 in particular) operates on an assumption that the callee-side terminal device 321 has completed resource reservation.

Sequences S313 to S315 are similar to Sequences S131 to S133 in FIG. 3.

The callee-side terminal device 321 receiving the "INVITE" in Sequence S315 reserves a resource (Sequence S316), starts calling, and transmits "180 Ringing" (Sequence S317).

Then, the callee-side S-CSCF 212 transmits the "180 Ringing" received in Sequence S317 to the callee-side CAT-AS 221 (Sequence S318).

The callee-side CAT-AS 221 terminates the received "180 Ringing." Further, in response to the "INVITE" received in Sequence S312, the callee-side CAT-AS 221 transmits a "183 (D1)" response (Sequence S319). At that time, the callee-side CAT-AS 221 sets a "sendrecv" parameter to the P-Early-Media header field in the "183 (D1)" response and transmits the "183 (D1)" response.

Note that dialogs "D1" and "D2" according to the forking model scheme are executed in parallel. Accordingly, a timing of the callee-side CAT-AS 221 transmitting a "183 (D1)" response is not limited to the timing in the example in FIG. 8. For example, the callee-side CAT-AS 221 may transmit a "183 (D1)" response in Sequence S319 before receiving "180 Ringing (D2)" in Sequence S318.

In the caller-side IBCF 113 in which the communication unit 410 receives the "183" response, the early media compatibility determination unit 483 detects that the "sendrecv" parameter is set to the P-Early-Media header field in the acquired "183" response. The caller-side IBCF 113 transmits the "183" response itself as-is to the caller-side terminal device 311. Specifically, the communication control unit 471 controls the communication unit 410 and causes the communication unit 410 to transmit the "183" response to the caller-side terminal device 311.

The caller-side terminal device 311 receiving the "183" response transmits a "PRACK" (Sequence S321). The caller-side IBCF 113 transmits the "PRACK" as-is to the callee-side network 200 side. Specifically, when the communication unit 410 receives the "PRACK," the communication control unit 471 controls the communication unit 410 and causes the communication unit 410 to transfer the "PRACK" to the callee-side network 200 side.

The callee-side CAT-AS 221 receiving the "PRACK" in Sequence S321 starts CAT media (Sequence S322). In other words, the callee-side CAT-AS 221 starts transmission processing of a customized ring back tone.

Further, the callee-side CAT-AS 221 transmits "200 OK (PRACK)" to the caller-side network 100 side (Sequence S323). In the caller-side IBCF 113 in which the communication unit 410 receives the "200 OK (PRACK)," the processing completion determination unit 484 confirms the "200 OK (PRACK)." Then, the communication unit 410 transmits the "200 OK (PRACK)" as-is to the caller-side terminal device 311 (Sequence S324). Specifically, the calling-in-progress notification transmission control unit 473 in the communication control unit 471 controls the communication unit 410 and causes the communication unit 410 to transfer the "200 OK (PRACK)" to the caller-side terminal device 311.

Further, the calling-in-progress notification transmission control unit 473 confirming the "200 OK (PRACK)" generates "180 Ringing." Then, the communication unit 410 transmits the "180 Ringing" generated by the calling-in-progress notification transmission control unit 473 to the caller-side terminal device 311, in accordance with control by the calling-in-progress notification transmission control unit 473 (Sequence S325).

Further, after transmitting the "200 OK (PRACK)" in Sequence S323, the callee-side CAT-AS 221 transmits an RBT (Sequence S331).

With regard to subsequent processing, illustration and description thereof are omitted.

Unlike the case that both of the caller-side network 100 and the callee-side network 200 are compatible with the precondition, when the caller-side network 100 is not compatible with the precondition, resource unreserved on the caller-side network 100 cannot be notified to the callee-side network 200 side by SDP, and consequently a "183 (D2)" response may not be acquired. Accordingly, by confirming the "sendrecv" parameter in the P-Early-Media header field in the "183 (D1)" response from the callee-side network 200 side, the caller-side IBCF 113 confirms that an RBT is transmitted from the callee-side network 200 side later. Then, when detecting "200 OK (PRACK)" indicating preparation completion, the caller-side IBCF 113 generates "180 Ringing" and transmits the "180 Ringing" to the caller-side terminal device 311. Consequently, the caller-side terminal device 311 is able to receive an RBT after receiving the "180 Ringing," and the caller-side terminal device 311 is expected to operate normally in accordance with the gateway model scheme.

Further, the method described with reference to FIGS. 8 and 9 may be applied to the case of the caller-side network 100 side being compatible with the precondition.

Furthermore, in a case that differs from the example in FIGS. 8 and 9 only in that the callee-side terminal device 321 has already reserved a resource when an "INVITE" is transmitted, "Resource available" on the callee-side network 200 side (Sequence S316 in FIG. 9) is simply positioned before the "INVITE," and the operation itself is similar to the example in FIGS. 8 and 9.

Figure 10:
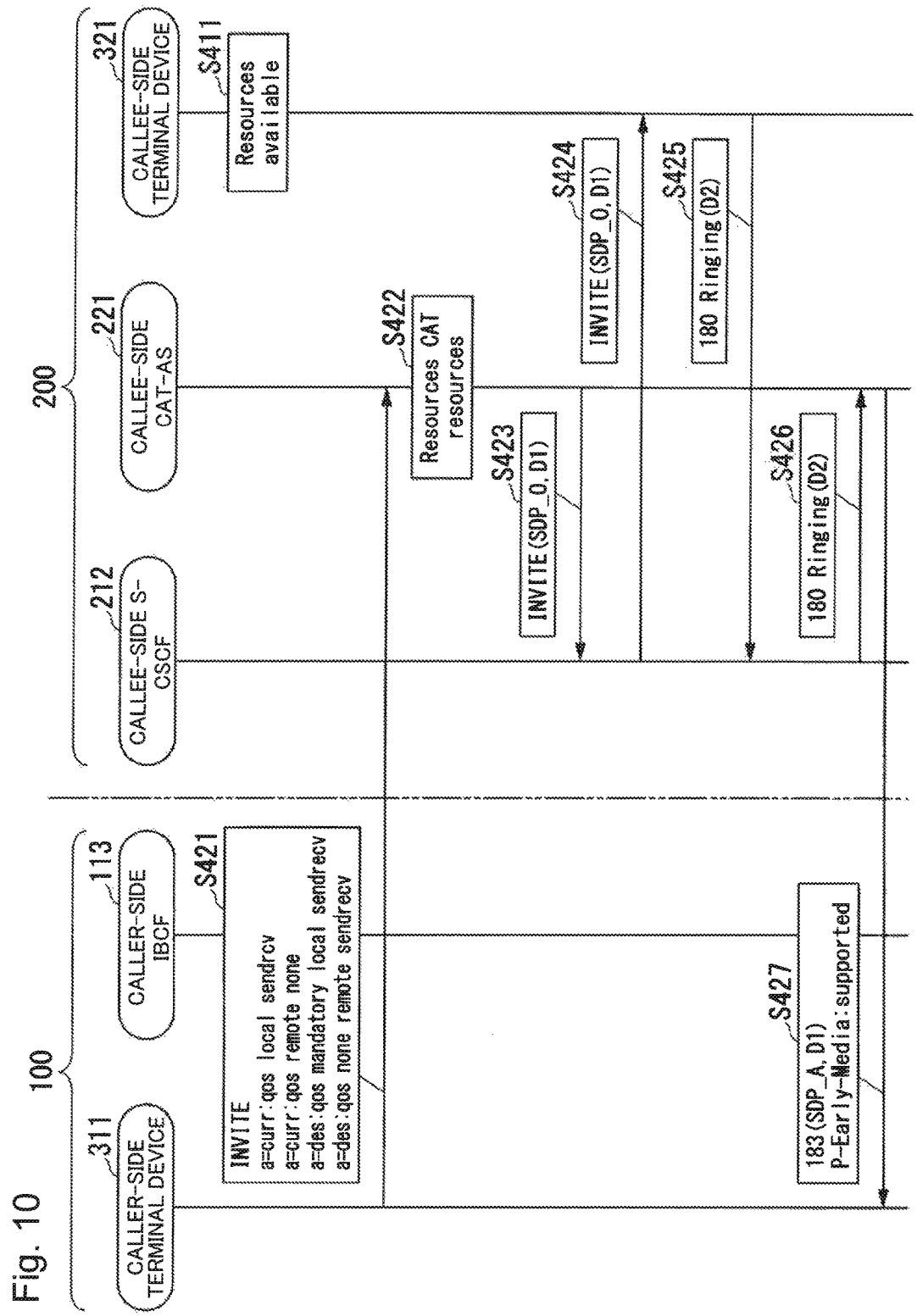
FIG. 10 is a diagram illustrating an operation example of the IMS network when the caller-side network side supports a precondition but the callee-side network side does not support the precondition, according to the example embodiment.
Figure 11:
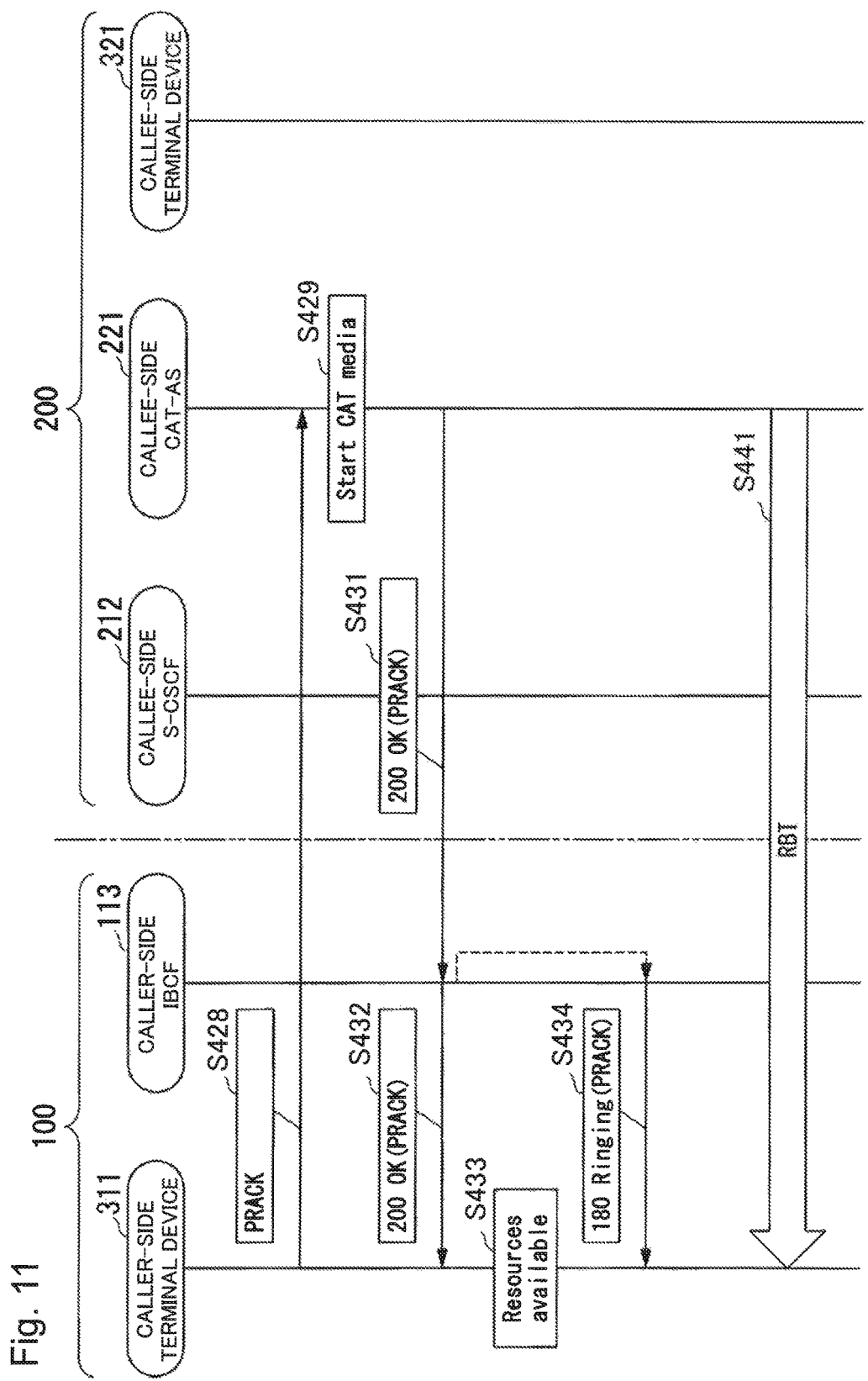
FIG. 11 is a diagram illustrating the operation example of the IMS network when the caller-side network side supports the precondition but the callee-side network side does not support the precondition, according to the example embodiment.

FIGS. 10 and 11 are diagrams illustrating an operation example of the IMS network 1 when the caller-side network 100 supports a precondition but the callee-side network 200 does not support the precondition. The caller-side network 100 employs the gateway model scheme, and the callee-side network 200 employs the forking model scheme.

The diagram illustrates an example of a case that, when the caller-side terminal device 311 transmits an "INVITE," the caller-side terminal device 311 has not reserved a resource. Since the callee-side network 200 does not support the precondition, the callee-side terminal device 321 is always able to use a resource when the callee-side terminal device 321 receives an "INVITE," as indicated in Sequence S411.

In the processing in the diagram, the caller-side terminal device 311 transmits an "INVITE" (Sequence S421). Since the caller-side terminal device 311 is compatible with the precondition, the caller-side terminal device 311 transmits the "INVITE" attached with SDP of the precondition. However, since the callee-side network 200 side is incompatible with the precondition, a device on the callee-side network 200 side ignores the SDP of the precondition.

The callee-side CAT-AS 221 receiving the "INVITE" in Sequence S421 prepares a CAT resource (Sequence S422). The callee-side CAT-AS 221 is in a state in which the callee-side CAT-AS 221 is able to transmit a customized ring back tone.

Then, the callee-side CAT-AS 221 transmits an "INVITE" to the callee-side S-CSCF 212 (Sequence S423). The callee-side S-CSCF 212 transmits an "INVITE" to the callee-side terminal device 321 (Sequence S424).

The callee-side terminal device 321 receiving the "INVITE" transmits "180 Ringing" when calling is started (Sequence S425).

The callee-side S-CSCF 212 receiving the "180 Ringing" in Sequence S425 transmits "180 Ringing" to the callee-side CAT-AS 221 (Sequence S426).

The callee-side CAT-AS 221 transmits a "183 (D1)" response in response to the received "180 Ringing" (Sequence S427). At that time, the callee-side CAT-AS 221 transmits the "183 (D1)" response in which a "sendrecv" parameter is set to the P-Early-Media header field.

In the caller-side IBCF 113 in which the communication unit 410 receives the "183" response, the early media compatibility determination unit 483 detects that the "sendrecv" parameter is set to the P-Early-Media header field in the acquired "183" response. The caller-side IBCF 113 transmits the "183" response itself as-is to the caller-side terminal device 311. Specifically, the communication control unit 471 controls the communication unit 410 and causes the communication unit 410 to transmit the "183" response to the caller-side terminal device 311.

The caller-side terminal device 311 receiving the "183" response transmits a "PRACK" (Sequence S428). The caller-side IBCF 113 transmits the "PRACK" as-is to the callee-side network 200 side. Specifically, when the communication unit 410 receives the "PRACK," the communication control unit 471 controls the communication unit 410 and causes the communication unit 410 to transfer the "PRACK" to the callee-side network 200 side.

The callee-side CAT-AS 221 receiving the "PRACK" in Sequence S428 starts CAT media (Sequence S429). In other words, the callee-side CAT-AS 221 starts transmission processing of a customized ring back tone.

Further, the callee-side CAT-AS 221 transmits "200 OK (PRACK)" to the caller-side network 100 side (Sequence S431). In the caller-side IBCF 113 in which the communication unit 410 receives the "200 OK (PRACK)," the signal adjustment unit 491 confirms the "200 OK (PRACK)." Then, the caller-side network 100 transmits the "200 OK (PRACK)" as-is to the caller-side terminal device 311 (Sequence S432). Specifically, the communication control unit 471 controls the communication unit 410 and causes the communication unit 410 to transfer the "200 OK (PRACK)" to the caller-side terminal device 311.

Further, the caller-side terminal device 311 reserves a resource (Sequence S433).

Further, the caller-side IBCF 113 confirming the "200 OK (PRACK)" generates "180 Ringing" and transmits the "180 Ringing" to the caller-side terminal device 311 (Sequence S434). Specifically, the calling-in-progress notification transmission control unit 473 generates the "180 Ringing." Then, the calling-in-progress notification transmission control unit 473 controls the communication unit 410 and causes the communication unit 410 to transmit the "180 Ringing" to the caller-side terminal device 311.

After transmitting the "200 OK (PRACK)" in Sequence S431, the callee-side CAT-AS 221 transmits an RBT (Sequence S441).

With regard to subsequent processing, illustration and description thereof are omitted.

When the callee-side network 200 is not compatible with the precondition, similarly to the example in FIGS. 8 and 9 of the caller-side network 100 not being compatible with the precondition, resource unreserved on the caller-side network 100 side cannot be notified to the callee-side network 200 side by SDP, and consequently a "183 (D2)" response may not be acquired. Accordingly, by confirming the "sendrecv" parameter setting in the P-Early-Media header field in the "183 (D1)" response from the callee-side network 200 side, the caller-side IBCF 113 confirms that an RBT is transmitted from the callee-side network 200 side later. Then, when detecting "200 OK (PRACK)" indicating preparation completion, the caller-side IBCF 113 generates "180 Ringing" and transmits the "180 Ringing" to the caller-side terminal device 311. Consequently, the caller-side terminal device 311 is able to receive an RBT after receiving the "180 Ringing," and the caller-side terminal device 311 is expected to operate normally in accordance with the gateway model scheme.

In addition, a timing of the caller-side IBCF 113 generating and transmitting "180 Ringing" is not limited to the timing of receiving the "200 OK (PRACK)" as described with reference to FIGS. 8 to 11. For example, the caller-side IBCF 113 may generate "180 Ringing" at a timing when receiving a response being "18x (D1)" in which a "sendrecv" parameter is set to the P-Early-Media header field, and transmit the "180 Ringing" to the caller-side terminal device 311.

Further, the method described with reference to FIGS. 10 and 11 may be applied to the case of the callee-side network 200 side being compatible with the precondition.

Furthermore, in a case that differs from the example in FIGS. 10 and 11 only in that the caller-side terminal device 311 has already reserved a resource when an "INVITE" is transmitted, "Resource available" on the caller-side network 100 side (Sequence S433 in FIG. 11) is simply positioned before the "INVITE," and the operation itself is similar to the example in FIGS. 10 and 11.

Moreover, when the caller-side network 100 in addition to the callee-side network 200 is not compatible with the precondition, the caller-side terminal device 311 is in a state in which a resource is available before transmission of an "INVITE," and the callee-side network 200 side operates on an assumption that a resource is also available on the caller-side network 100 side. Accordingly, the operation of the IMS network 1 in this case is similar to the case that the caller-side terminal device 311 has already reserved a resource when an "INVITE" is transmitted in the example in FIGS. 10 and 11, and an outline of the operation of the IMS network 1 is similar to the example in FIGS. 10 and 11.

When both of the caller-side network 100 side and the callee-side network 200 side are compatible with the precondition, the method of notifying resource unreserved on the caller-side network 100 side by SDP may be used. The method is described with reference to FIGS. 3 to 7. The method is hereinafter referred to as a first method.

On the other hand, when either or both of the caller-side network 100 side and the callee-side network 200 side are not compatible with the precondition, the method of detecting a "sendrecv" parameter setting in the P-Early-Media header field in a "18x" response may be used. The method is described with reference to FIGS. 8 to 11. The method is hereinafter referred to as a second method.

Figure 12:
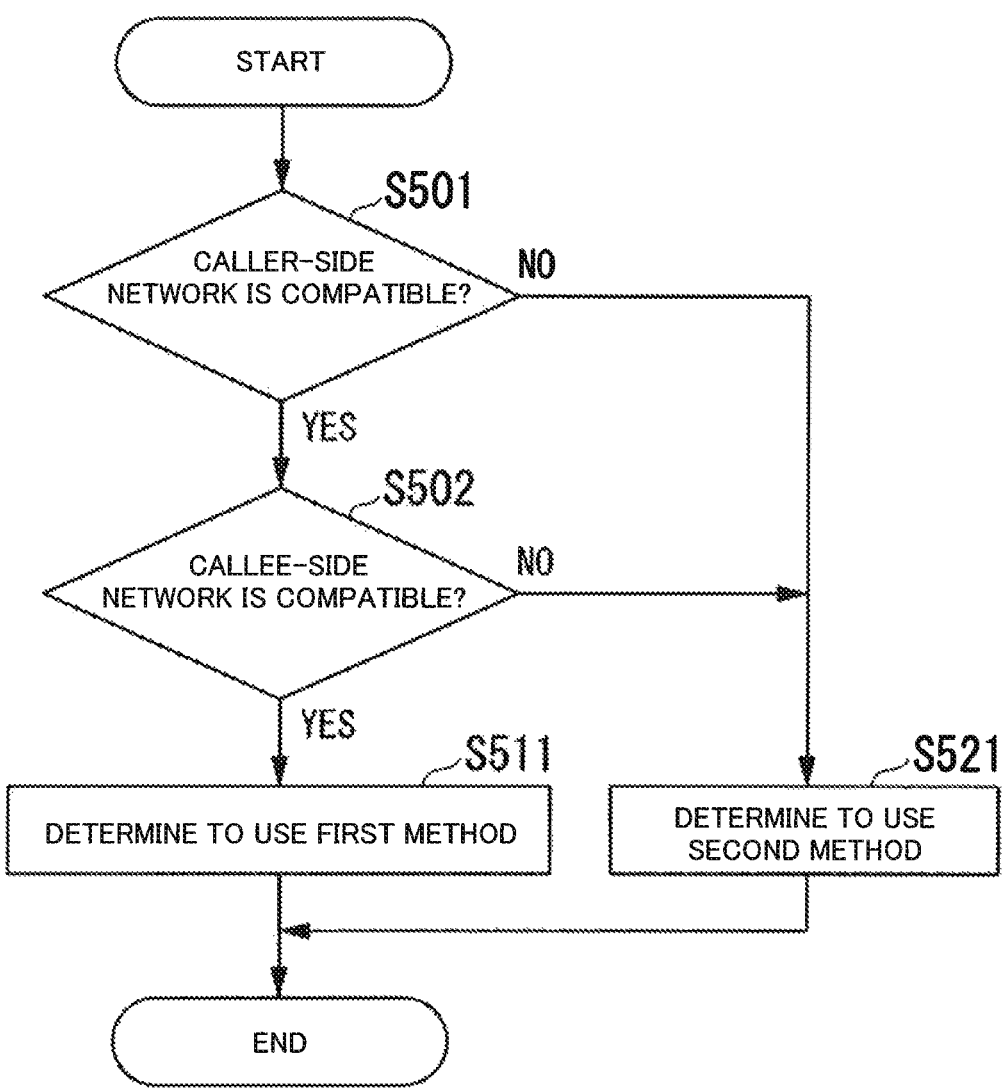
FIG. 12 is a diagram illustrating an example of a procedure of the caller-side IBCF according to the example embodiment determining which of a first method and a second method is to be used.

For example, the caller-side IBCF 113 is able to determine which of the first method and the second method is to be used, in accordance with a procedure illustrated in FIG. 12.

FIG. 12 is a diagram illustrating an example of a procedure of the caller-side IBCF 113 determining which of the first method and the second method is to be used.

In the processing in the diagram, the support determination unit 481 determines whether the caller-side network 100 side is compatible with a precondition (Step S501). For example, as described above, the support determination unit 481 makes a determination in Step S501 by referring to a header in an "INVITE" from the caller-side terminal device 311.

When determining that the caller-side network 100 side is compatible (Step S501: YES), the support determination unit 481 determines whether or not the callee-side network 200 side is compatible with the precondition (Step S502). For example, as described above, the support determination unit 481 determines whether or not the callee-side network 200 side supports the precondition by referring to a parameter in a response signal (e.g. a "183 (D1)" response) from the callee-side network 200 side.

When determining that the callee-side network 200 side is compatible (Step S502: YES), the control unit 460 determines to use the first method (Step S511). Subsequently to Step S511, the control unit 460 ends the processing in FIG. 12.

On the other hand, when determining in Step S501 that the caller-side network 100 side is not compatible with the precondition (Step S501: NO), the control unit 460 determines to use the second method (Step S521). Subsequently to Step S521, the control unit 460 ends the processing in FIG. 12.

Further, when determining in Step S502 that the callee-side network 200 side is not compatible with the precondition (Step S502: NO), the control unit 460 also moves to Step S521.

As described above, the resource reservation status determination unit 482 determines whether or not a value of a parameter (SDP value) indicating resource reservation status of the caller-side terminal device 311 is a value indicating reserved. The parameter is included in an "INVITE" transmitted by the caller-side terminal device 311 and received by the communication unit 410. When the resource reservation status determination unit 482 determines that the SDP value is a value indicating reserved, the parameter value rewriting unit 492 rewrites the SDP value to a value indicating resource unreserved.

When the resource reservation status determination unit 482 determines that the SDP value is a value indicating reserved, the session start request transmission control unit 472 controls the communication unit 410 in such a way that the communication unit 410 transmits to the callee-side network 200 the "INVITE" in which the SDP value is rewritten by the parameter value rewriting unit 492. On the other hand, when the resource reservation status determination unit 482 determines that the SDP value is not a value indicating reserved, the session start request transmission control unit 472 controls the communication unit 410 in such a way that the communication unit 410 transmits to the callee-side network 200 the "INVITE" received from the caller-side terminal device 311.

When a "183 (D2)" response to the "INVITE" indicates source reserved in the callee-side terminal device, the calling-in-progress notification transmission control unit controls the communication unit 410 in such a way that the communication unit 410 transmits "180 Ringing" to the caller-side terminal device 311.

Consequently, the caller-side terminal device 311 is able to receive an RBT after receiving the "180 Ringing," and the caller-side terminal device 311 is expected to operate normally in accordance with the gateway model scheme. Accordingly, the caller-side IBCF 113 is able to provide a service based on early media even when early media schemes differ between the caller-side and the callee-side in IMS.

Further, the support determination unit 481 determines whether all of the caller-side network 100 and the caller-side terminal device 311, and the callee-side network 200 and the callee-side terminal device 321 are compatible with a precondition, based on a signal received by the communication unit 410.

When the support determination unit 481 determines that at least one of the caller-side network 100 and the caller-side terminal device 311, and the callee-side network 200 and the callee-side terminal device 321 is not compatible with the precondition, the early media compatibility determination unit 483 determines whether or not a "sendrecv" parameter is set to the P-Early-Media header field in a "183 (D1)" response from the callee-side network 200. After the early media compatibility determination unit determines that a "sendrecv" parameter is set to the P-Early-Media header field in the "183 (D1)" response, the processing completion determination unit 484 determines whether or not the communication unit 410 receives "200 OK (PRACK)" from the callee-side network 200

When the processing completion determination unit 484 determines that the communication unit 410 receives "200 OK (PRACK)," the calling-in-progress notification transmission control unit 473 controls the communication unit 410 in such a way that the communication unit 410 transmits "180 Ringing" to the caller-side terminal device 311.

Further, when the support determination unit 481 determines that all of the caller-side network 100 and the caller-side terminal device 311, and the callee-side network 200 and the callee-side terminal device 321 are compatible with the precondition, the resource reservation status determination unit 482 determines whether or not a value of a parameter (SDP value) indicating resource reservation status of the caller-side terminal device 311 is a value indicating reserved. The parameter is included in the "INVITE" transmitted by the caller-side terminal device 311 and received by the communication unit 410.

Consequently, even when any of the caller-side network 100 and the caller-side terminal device 311, and the callee-side network 200 and the callee-side terminal device 321 is not compatible with the precondition, the caller-side terminal device 311 is able to receive an RBT after receiving "180 Ringing," and the caller-side terminal device 311 is expected to operate normally in accordance with the gateway model scheme. Accordingly, the caller-side IBCF 113 enables the caller-side terminal device 311 to provide a service based on early media even when early media schemes differ between the caller-side and the callee-side in IMS, and also any of the caller-side network 100 and the caller-side terminal device 311, and the callee-side network 200 and the callee-side terminal device 321 is not compatible with the precondition.

Further, the early media compatibility determination unit 483 determines whether or not a "sendrecv" parameter is set to the P-Early-Media header field in a "183 (D1)" response from the callee-side network 200. After the early media compatibility determination unit determines that a "send-recv" parameter is set to the P-Early-Media header field in the "183 (D1)" response, the processing completion determination unit 484 determines whether or not the communication unit 410 receives "200 OK (PRACK)" from the callee-side network 200.

When the processing completion determination unit 484 determines that the communication unit 410 receives "200 OK (PRACK)," the calling-in-progress notification transmission control unit 473 controls the communication unit 410 in such a way that the communication unit 410 transmits "180 Ringing" to the caller-side terminal device 311.

Consequently, even when any of the caller-side network 100 and the caller-side terminal device 311, and the callee-side network 200 and the callee-side terminal device 321 is not compatible with a precondition, the caller-side terminal device 311 is able to receive an RBT after receiving the "180 Ringing," and the caller-side terminal device 311 is expected to operate normally in accordance with the gateway model scheme. Accordingly, the caller-side IBCF 113 enables the caller-side terminal device 311 to provide a service based on early media even when early media schemes differ between the caller-side and the callee-side in IMS, and also any of the caller-side network 100 and the caller-side terminal device 311, and the callee-side network 200 and the callee-side terminal device 321 is not compatible with the precondition.

Next, a minimum configuration of the present invention will be described with reference to FIGS. 13 and 14.

Figure 13:
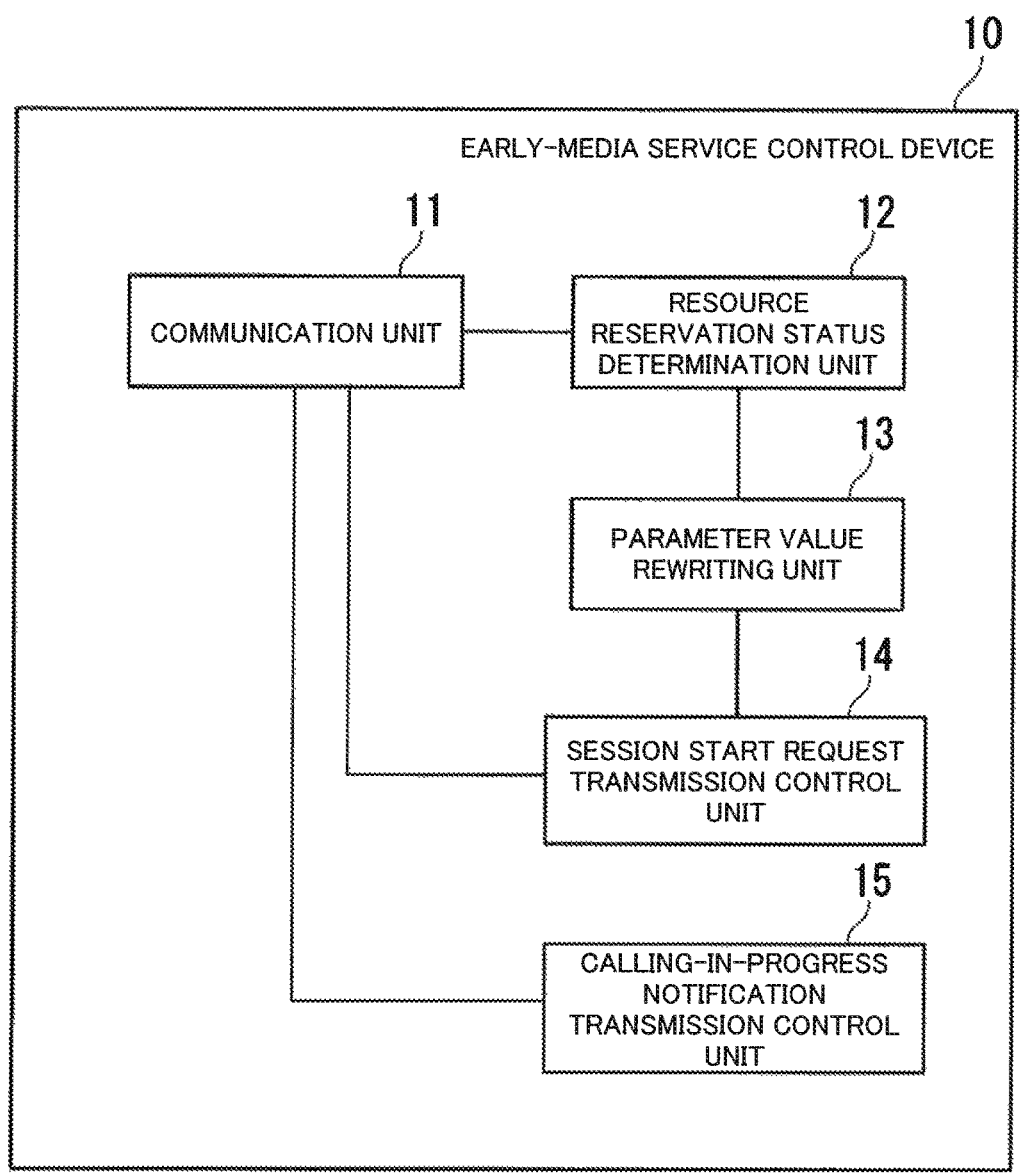
FIG. 13 is a diagram illustrating a first example of a minimum configuration of an early-media service control device according to the present invention.

FIG. 13 is a diagram illustrating a first example of a minimum configuration of an early-media service control device according to the present invention. An early-media service control device 10 illustrated in the diagram includes a communication unit 11, a resource reservation status determination unit 12, a parameter value rewriting unit 13, a session start request transmission control unit 14, and a calling-in-progress notification transmission control unit 15.

In such a configuration, the resource reservation status determination unit 12 determines whether or not a value of a parameter indicating resource reservation status of a session-start-request-transmitting terminal device is a value indicating reserved. The parameter is included in a session start request transmitted by the session-start-request-transmitting terminal device and received by the communication unit 11. The session-start-request-transmitting terminal device is based on an early media scheme of starting early-media service execution with receipt of a calling-in-progress notification as one requirement.

Further, when the resource reservation status determination unit 12 determines that the value of the parameter is a value indicating reserved, the parameter value rewriting unit 13 rewrites the value of the parameter to a value indicating resource unreserved.

Furthermore, when the resource reservation status determination unit 12 determines that the value of the parameter is a value indicating reserved, the session start request transmission control unit 14 controls the communication unit 11 in such a way that the communication unit 11 transmits to a session-start-request-receiving network a session start request in which the value of the parameter is rewritten by the parameter value rewriting unit 13, and when the resource reservation status determination unit 12 determines that the value of the parameter is not a value indicating reserved, the session start request transmission control unit 14 controls the communication unit 11 in such a way that the communication unit 11 transmits to the session-start-request-receiving network a session start request received from the session-start-request-transmitting terminal device.

Then, when communication unit 11 receives a response indicating resource reserved in the session-start-request-receiving terminal device, the calling-in-progress notification transmission control unit 15 controls the communication unit 11 in such a way that the communication unit 11 transmits a calling-in-progress notification to the session-start-request-transmitting terminal device. The response is transmitted in response to the session start request transmitted to the session-start-request-receiving network by the communication unit 11.

Hence, the session-start-request-transmitting terminal device is able to receive early-media service media (data) after receiving the calling-in-progress notification. Consequently, the session-start-request-transmitting terminal device is expected to operate normally in accordance with a scheme of receiving early-media service media after receiving a calling-in-progress notification. Accordingly, the early-media service control device 10 is able to provide a service based on early media even when early media schemes differ between the caller-side and the callee-side in IMS.

Figure 14:
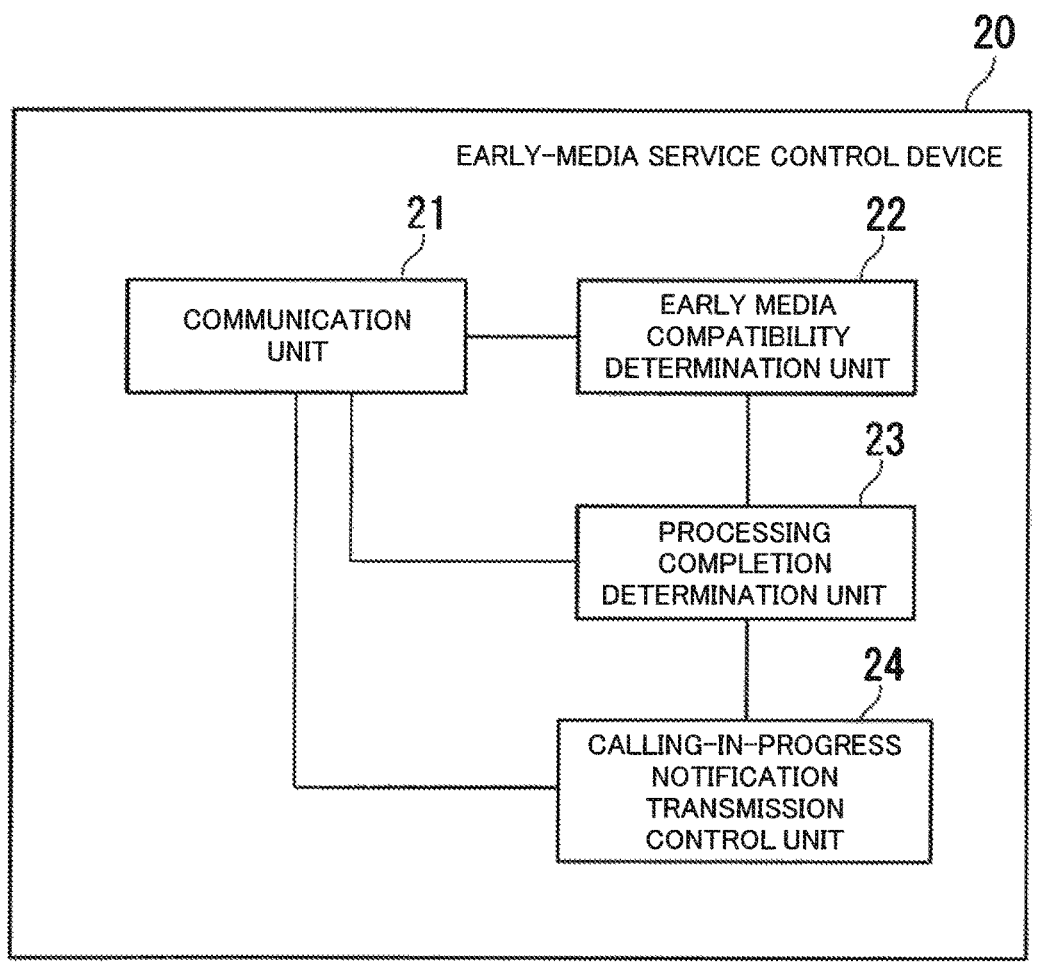
FIG. 14 is a diagram illustrating a second example of the minimum configuration of the early-media service control device according to the present invention.

FIG. 14 is a diagram illustrating a second example of the minimum configuration of the early-media service control device according to the present invention. An early-media service control device 20 illustrated in the diagram includes a communication unit 21, an early media compatibility determination unit 22, a processing completion determination unit 23, and a calling-in-progress notification transmission control unit 24.

In such a configuration, the early media compatibility determination unit 22 determines whether or not early media compatibility information indicating that a session-start-request-receiving network is compatible with early media is included in a response to a session start request.

Further, after the early media compatibility determination unit 22 determines that early media compatibility information is included in the response, the processing completion determination unit 23 determines whether or not the communication unit receives a processing completion signal indicating normal completion of request processing from the session-start-request-receiving network.

Then, when the processing completion determination unit 23 determines that the communication unit 21 receives a processing completion signal, the calling-in-progress notification transmission control unit 24 controls the communication unit 21 in such a way that the communication unit 21 transmits a calling-in-progress notification to a session-start-request-transmitting terminal device. The session-start-request-transmitting terminal device is based on an early media scheme of starting early-media service execution with receipt of a calling-in-progress notification as one requirement.

Hence, even when any of a session-start-request-transmitting network and the session-start-request-transmitting terminal device, and the session-start-request-receiving network and a session-start-request-receiving terminal device is not compatible with a resource reservation notification specification, the session-start-request-transmitting terminal device is able to receive early-media service media after receiving a calling-in-progress notification. Consequently, the session-start-request-transmitting terminal device is expected to operate normally in accordance with a scheme of receiving early-media service media after receiving a calling-in-progress notification. Accordingly, the early-media service control device 10 is able to provide a service based on early media even when early media schemes differ between the caller-side and the callee-side in IMS, and also any of the session-start-request-transmitting network and the session-start-request-transmitting terminal device, and the session-start-request-receiving network and the session-start-request-receiving terminal device is not compatible with the resource reservation notification specification.

In addition, the processing in each unit may be performed by recording a program for providing the functions of the caller-side IBCF 113 in whole or in part into a computer-readable recording medium and causing a computer system to read and execute the program recorded in the recording medium. Note that the "computer system" herein includes an OS and hardware such as peripheral equipment.

Further, the "computer-readable recording medium" refers to a portable medium such as a flexible disk, a magneto-optical disk, a ROM, or a CD-ROM, or a storage device such as a hard disk built into the computer system. Furthermore, the program described above may be a program for providing part of the aforementioned functions and may further be a program providing the aforementioned functions by a combination with a program already recorded in the computer system.

While the example embodiment of the present invention has been described above with reference to the drawings, a specific configuration is not limited to the example embodiment, and a design or the like without departing from the spirit of the present invention is also included.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-038277, filed on Feb. 29, 2016, the disclosure of which is incorporated herein in its entirety by reference.

REFERENCE SIGNS LIST

1 IMS network
10, 20 Early-media service control device
11, 21, 410 Communication unit
12, 482 Resource reservation status determination unit
13, 492 Parameter value rewriting unit
14, 472 Session start request transmission control unit
15, 24, 473 Calling-in-progress notification transmission control unit
22, 483 Early media compatibility determination unit
23, 484 Processing completion determination unit
100 Caller-side network
111 Caller-side P-CSCF
112 Caller-side S-CSCF
113 Caller-side IBCF
114 Caller-side TrGW
200 Callee-side network
211 Callee-side P-CSCF
212 Callee-side S-CSCF
213 Callee-side IBCF
214 Callee-side TrGW
221 Callee-side CAT-AS
311 Caller-side terminal device
321 Callee-side terminal device
450 Storage unit
460 Control unit
471 Communication control unit
481 Support determination unit
491 Signal adjustment unit

What is claimed is:

1. An early-media service control device comprising:
    a communication unit;
    a resource reservation status determination unit that determines whether or not a value of a parameter indicating resource reservation status of a session-start-request-transmitting terminal device is a value indicating reserved, the parameter being included in a session start request transmitted by the session-start-request-transmitting terminal device and received by the communication unit, the session-start-request-transmitting terminal device being based on an early media scheme of starting early-media service execution with receipt of a calling-in-progress notification as one requirement;
    a parameter value rewriting unit that, when the resource reservation status determination unit determines that the value of the parameter is a value indicating reserved, rewrites the value of the parameter to a value indicating resource unreserved;
    a session start request transmission control unit that, when the resource reservation status determination unit determines that the value of the parameter is a value indicating reserved, controls the communication unit in such a way that the communication unit transmits, to a session-start-request-receiving network, a session start request in which a value of a parameter is rewritten by the parameter value rewriting unit, and when the resource reservation status determination unit determines that the value of the parameter is not a value indicating reserved, controls the communication unit in such a way that the communication unit transmits, to a session-start-request-receiving network, a session start request received from the session-start-request-transmitting terminal device; and
    a calling-in-progress notification transmission control unit that, when the communication unit receives a response indicating resource reserved in a session-start-request-receiving terminal device, controls the communication unit in such a way that the communication unit transmits the calling-in-progress notification to the session-start-request-transmitting terminal device, the response being transmitted in response to the session start request transmitted to the session-start-request-receiving network by the communication unit.

2. The early-media service control device according to claim 1, further comprising:
    a support determination unit that determines whether or not all of a session-start-request-transmitting network and a session-start-request-transmitting terminal device, and a session-start-request-receiving network and a session-start-request-receiving terminal device are compatible with a specification for notifying existence or nonexistence of a resource reservation, based on a signal received by the communication unit;
    an early media compatibility determination unit that, when the support determination unit determines that at least one of a session-start-request-transmitting network and a session-start-request-transmitting terminal device, and a session-start-request-receiving network and a session-start-request-receiving terminal device is not compatible with a specification for notifying existence or nonexistence of a resource reservation, determines whether or not early media compatibility information indicating that a session-start-request-receiving network is compatible with early media is included in a response to a session start request;
    a processing completion determination unit that, after the early media compatibility determination unit determines that the early media compatibility information is included in the response, determines whether or not the communication unit receives a processing completion signal indicating normal completion of request processing from the session-start-request-receiving network; and
    a calling-in-progress notification transmission control unit that, when the processing completion determination unit determines that the communication unit receives the processing completion signal, controls the communication unit in such a way that the communication unit transmits the calling-in-progress notification to a session-start-request-transmitting terminal device, the session-start-request-transmitting terminal device being based on an early media scheme of starting early-media service execution with receipt of the calling-in-progress notification as one requirement,
    wherein, when the support determination unit determines that all of a session-start-request-transmitting network and a session-start-request-transmitting terminal device, and a session-start-request-receiving network and a session-start-request-receiving terminal device are compatible with a specification for notifying existence or nonexistence of a resource reservation, the resource reservation status determination unit determines whether or not a value of a parameter indicating resource reservation status of the session-start-request-transmitting terminal device is a value indicating reserved, the parameter being included in a session start request transmitted by the session-start-request-transmitting terminal device and received by the communication unit.

3. An early-media service control device comprising:
    a communication unit;
    an early media compatibility determination unit that determines whether or not a response to a session start request includes early media compatibility information indicating that a session-start-request-receiving network is compatible with early media;
    a processing completion determination unit that, after the early media compatibility determination unit determines that the response includes the early media compatibility information, determines whether or not the communication unit receives a processing completion signal indicating normal completion of request processing from the session-start-request-receiving network; and
    a calling-in-progress notification transmission control unit that, when the processing completion determination unit determines that the communication unit receives the processing completion signal, controls the communication unit in such a way that the communication unit transmits a calling-in-progress notification to a session-start-request-transmitting terminal device, the session-start-request-transmitting terminal device being based on an early media scheme of starting early-media service execution with receipt of the calling-in-progress notification as one requirement.

4. An early-media service control method by an early-media service control device including a communication unit, the method comprising:
    determining whether or not a value of a parameter indicating resource reservation status of a session-start-request-transmitting terminal device is a value indicating reserved, the parameter being included in a session start request transmitted by the session-start-request-transmitting terminal device and received by the communication unit, the session-start-request-transmitting terminal device being based on an early media scheme of starting early-media service execution with receipt of a calling-in-progress notification as one requirement;

when, in the determination, determining that the value of the parameter is a value indicating reserved, rewriting the value of the parameter to a value indicating resource unreserved;

when, in the determination, determining that the value of the parameter is a value indicating reserved, controlling the communication unit in such a way that the communication unit transmits, to a session-start-request-receiving network, a session start request in which a value of a parameter is rewritten, and when, in the determination, determines that the value of the parameter is not a value indicating reserved, controlling the communication unit in such a way that the communication unit transmits, to a session-start-request-receiving network, a session start request received from the session-start-request-transmitting terminal device; and when receiving a response indicating resource reserved in a session-start-request-receiving terminal device, controlling the communication unit in such a way that the communication unit transmits the calling-in-progress notification to the session-start-request-transmitting terminal device, the response being transmitted in response to the session start request transmitted to the session-start-request-receiving network.

5. The early-media service control method according to claim 4 by the early-media service control device, the method further comprising:

determining whether or not all of a session-start-request-transmitting network and a session-start-request-transmitting terminal device, and a session-start-request-receiving network and a session-start-request-receiving terminal device are compatible with a specification for notifying existence or nonexistence of a resource reservation, based on a signal received by the communication unit;

when, in a determination based on a signal received by the communication unit, determining that at least one of a session-start-request-transmitting network and a session-start-request-transmitting terminal device, and a session-start-request-receiving network and a session-start-request-receiving terminal device is not compatible with a specification for notifying existence or nonexistence of a resource reservation, determining whether or not a response to a session start request includes early media compatibility information indicating that a session-start-request-receiving network is compatible with early media;

after, in the determination, determining that the response includes the early media compatibility information, determining whether or not the communication unit receives a processing completion signal indicating normal completion of request processing from the session-start-request-receiving network;

when, in the determination, determining that the communication unit receives the processing completion signal, controlling the communication unit in such a way that the communication unit transmits the calling-in-progress notification to a session-start-request-transmitting terminal device, the session-start-request-transmitting terminal device being based on an early media scheme of starting early-media service execution with receipt of the calling-in-progress notification as one requirement; and when, in a determination based on a signal received by the communication unit, determining that all of a session-start-request-transmitting network and session-start-request-transmitting terminal device, and a session-start-request-receiving network and a session-start-request-receiving terminal device are compatible with a specification for notifying existence or nonexistence of a resource reservation, determining whether or not a value of a parameter indicating resource reservation status of the session-start-request-transmitting terminal device is a value indicating reserved, the parameter being included in a session start request transmitted by the session-start-request-transmitting terminal device and received by the communication unit.

6. An early-media service control method by an early-media service control device including a communication unit, the method comprising:

determining whether or not a response to a session start request includes early media compatibility information indicating that a session-start-request-receiving network is compatible with early media;

after, in the determination, determining that the response includes the early media compatibility information, determining whether or not the communication unit receives a processing completion signal indicating normal completion of request processing from the session-start-request-receiving network; and when, in the determination, determining that the communication unit receives the processing completion signal, controlling the communication unit in such a way that the communication unit transmits a calling-in-progress notification to a session-start-request-transmitting terminal device, the session-start-request-transmitting terminal device being based on an early media scheme of starting early-media service execution with receipt of the calling-in-progress notification as one requirement.

* * * * *